(12) United States Patent
Kujirai

(10) Patent No.: US 6,307,637 B1
(45) Date of Patent: Oct. 23, 2001

(54) PRINTING CONTROL APPARATUS AND METHOD

(75) Inventor: Yasuhiro Kujirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/103,801

(22) Filed: Jun. 24, 1998

(30) Foreign Application Priority Data

Feb. 7, 1996 (JP) .................................................. 9-177276

(51) Int. Cl.[7] ............................. B41B 15/00; H04N 1/21; G03G 15/00
(52) U.S. Cl. ...................... 358/1.11; 358/1.16; 358/1.17; 358/296; 399/8; 399/408
(58) Field of Search ............................ 358/1.11, 1.2, 358/1.9, 1.12, 1.13, 1.14, 1.15, 1.16, 1.17, 296; 399/8, 408; 382/135

(56) References Cited

U.S. PATENT DOCUMENTS 5,442,432 * 8/1995 Tani ................................... 399/410
5,872,900 * 2/1999 Tsuchitoi ............................ 358/1.12

* cited by examiner

Primary Examiner—Edward Coles
Assistant Examiner—Twyler Lamb
(74) Attorney, Agent, or Firm—Fitzpatrick, Cella, Harper & Scinto

(57) ABSTRACT

A spool file manager lays out print data, which has been stored in a spool file, in a format wherein the data is printed on each side of printing paper in conformity with a specified method of bookbinding printing. Specified methods of bookbinding printing include a method in which all output sheets of paper are folded in half collectively, and a method of gathering a certain number of sheets together at a time, folding the certain numbers of sheets in half and putting them in order. Pages that have been stored in the spool file are rearranged and printed out in accordance with the particular method. Sheets of paper that have thus been printed on are folded in half, in the order in which they are output, gathering together a certain number of sheets at a time, thus making it possible to bind the sheets together in the form of a book.

86 Claims, 14 Drawing Sheets

PRINTING CONTROL APPARATUS AND METHOD

BACKGROUND OF THE INVENTION

This invention relates to a printing control apparatus and method and, more particularly, to a printing control apparatus and method through which printed matter is output in a state in which it can be bound in book form in a system comprising an information processor such as a personal computer and an output unit such as a printer.

When bookbinding printing is performed using a printer having a double-sided printing unit, i.e., when printing is performed so that the printed pages are arranged in order by folding printed sheets of paper in half, the prior art is such that pages to be printed are accumulated in the memory of the printer and are output after the pages are arranged internally of the printer. In accordance with this technique, four consecutive pages are arranged and printed on one sheet of paper in such manner that the pages will follow one another in numerical order if the sheet of paper is folded in half.

With this conventional method of printing using a printer according to the prior art, bookbinding cannot be carried out unless the printed matter that has been output by the printer is first folded in half sheet by sheet and then arranged so that the proper page order is obtained for the entire document. Consequently, the user must fold each sheet of the paper in half one sheet at a time. This entails a great amount of labor on the user's part if the number of pages is large.

SUMMARY OF THE INVENTION

Accordingly, an object of the present invention is to provide a printing control apparatus and method whereby labor required of the operator is reduced, the operator is provided with a greater degree of freedom in terms of selections that can be made and documents can be printed and bound in simple fashion.

According to the present invention, the foregoing object is attained by providing a printing control apparatus connected to a printing apparatus, comprising input means for inputting a bookbinding setting which indicates a layout of pages on a printing medium before the printing medium is bound into book form, storage means for storing print data so that the print data can be read out in a desired sequence in units of individual pages, layout means for deciding, in accordance with the bookbinding setting, layout of pages of the print data to be sent to the printing apparatus, and output means for reading print data out of the storage means in a sequence that is in accordance with the layout decided by the layout means, and outputting the print data to the printing apparatus.

Further, according to the present invention, the foregoing object is attained by providing a printing control method for controlling a printing apparatus, comprising an input step of inputting a bookbinding setting which indicates a layout of pages on a printing medium before the printing medium is bound into book form, a storage step of storing print data so that the print data can be read out in a desired sequence in units of individual pages, a layout step of deciding, in accordance with the bookbinding setting, layout of pages of the print data to be sent to the printing apparatus, and an output step of reading out print data from the storage step in a sequence that is in accordance with the layout decided by the layout step, and outputting the print data to the printing apparatus.

According to another aspect of the present invention, there is provided a printing system comprising a printing apparatus and a printing control apparatus connected to the printing apparatus, the system having input means for inputting a bookbinding setting which indicates a layout of pages on a printing medium before the printing medium is bound into book form, storage means for storing print data so that the print data can be read out in a desired sequence in units of individual pages, layout means for deciding, in accordance with the bookbinding setting, layout of pages of the print data to be sent to the printing apparatus, and output means for reading print data out of the storage means in a sequence that is in accordance with the layout decided by the layout means, and outputting the print data to the printing apparatus, wherein the printing apparatus prints on both sides of the printing medium in the sequence sent from the output means.

According to another aspect of the present invention, there is provided a computer readable storage medium storing a program by which the following means are implemented by a computer connected to a printing apparatus: input means for inputting a bookbinding setting which indicates a layout of pages on a printing medium before the printing medium is bound into book form, storage means for storing print data so that the print data can be read out in a desired sequence in units of individual pages, layout means for deciding, in accordance with the bookbinding setting, layout of pages of the print data to be sent to the printing apparatus, and output means for reading print data out of the storage means in a sequence that is in accordance with the layout decided by the layout means, and outputting the print data to the printing apparatus.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments to which the present invention is applied will now be described.

[First Embodiment]

Figure 1:
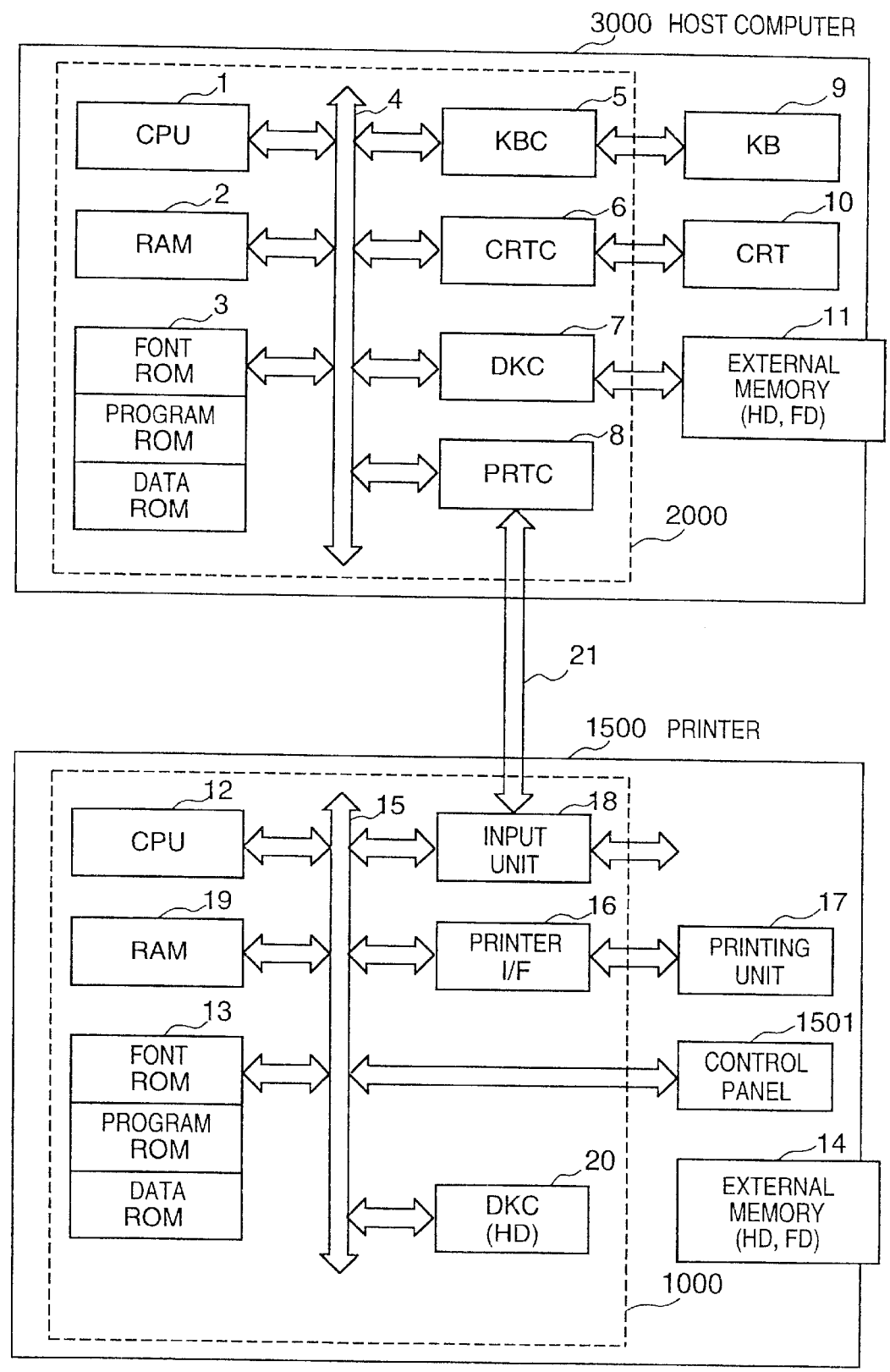
FIG. 1 is a block diagram of a printing system according to an embodiment of the present invention.

FIG. 1 is a block diagram showing a printer control system illustrating an embodiment of the present invention. It should be noted that as long as the functions of the present invention are executed, the arrangement of the invention may be a stand-alone device, a system comprising a plurality of devices or a system in which processing is executed upon making a connection via a network such as a LAN or WAN.

<Configuration of Printing System>

The system shown in FIG. 1 includes a host computer 3000 having a CPU 1 which, on the basis of a programming ROM in a ROM 3 or a document processing program that has been stored in an external memory 11, executes the processing of a document containing mixed objects such as graphics, images, characters and tables (inclusive of spreadsheets, etc.). The CPU 1 performs overall control of various devices connected to a system bus. An operating system, which is the control program of the CPU 1, is stored in a program ROM of the ROM 3 or in the external memory 11. Font data used when the above-mentioned document processing is executed is stored in a font ROM of the ROM 3 or in the external memory 11. Various data used when the above-mentioned document processing is executed is stored in a data ROM of the ROM 3 or in the external memory 11. The RAM 2 functions as the main memory and work area of the CPU 1.

A keyboard controller (KBC) 5 controls inputs from a keyboard 9 and pointing device, which is not shown. A CRT controller (CRTC) 6 controls the display on a CRT display (CRT) 10. A disk controller (DKC) 7 controls access to the external memory 11, such as a hard disk (HD) or floppy disk (FD), which stores a booting program, various applications, font data, user files, edited files and a program (referred to as a "printer driver" below) for generating printer control commands. A printer controller (PRTC) 8, which is connected to a printer 1500 via a bidirectional interface 21, executes processing for controlling communication with the printer 1500.

The CPU 1 executes processing to rasterize outline fonts in a RAM area, provided in, say, the RAM 2, that stores display information, and implements a WYSIWYG (What You See Is What You Get) function using the CRT 10. Further, on the basis of commands designated by a mouse cursor (not shown) on the CRT 10, the CPU 1 opens various windows that have been registered and executes a variety of data processing. When printing is executed, the user opens a window relating to printing settings, sets the printer and sets a printing processing method in regard to the printer driver, the setting including the selection of a printing mode.

The printer 1500 has a CPU 12 which, on the basis of a control program stored in a program ROM of a ROM 13 or a control program stored in an external memory 14, outputs an image signal, which serves as output information, to a printing unit (printer engine) 17 connected to a system bus 15. A control program of the CPU 12 is stored in a program ROM of the ROM 13. Font data used when the above-mentioned output information is generated is stored in a font ROM of the ROM 13. In case of a printer not equipped with the external memory 14 such as a hard disk, information utilized in the host computer is stored in a data ROM of the ROM 13.

The CPU 12, which can execute processing for communicating with the host computer via an input unit 18, is adapted so as to be capable of notifying the host computer 3000 of information internal to the printer 1500. A RAM 19, which functions as the main memory and work area of the CPU 12, is so adapted that memory capacity can be expanded by optional RAM connected to add-on memory, not shown. The RAM 19 is used as an area for expanding output information and as an area for storing environment data. Further, the RAM is supplied with power continuously and therefore serves as an NVRAM (non-volatile RAM). The external memory 14, such a hard disk (HD) or IC card, has its access controlled by a memory controller (MC) 20. The external memory 14, which is connected to the printer as an option, stores font data, an emulation program and form data, etc. Further, a control panel 1501 has an array of operation switches and LED indicators.

The external memory is not limited to a single memory. An arrangement may be adopted in which a plurality of optional cards storing optional fonts to supplement the internal fonts or a plurality of external memories storing programs for interpreting printer control languages of different language systems can be connected to the apparatus. Furthermore, the external memory 14 may have an NVRAM (not shown) for storing printer mode setting information from the control panel 1501.

Figure 2:
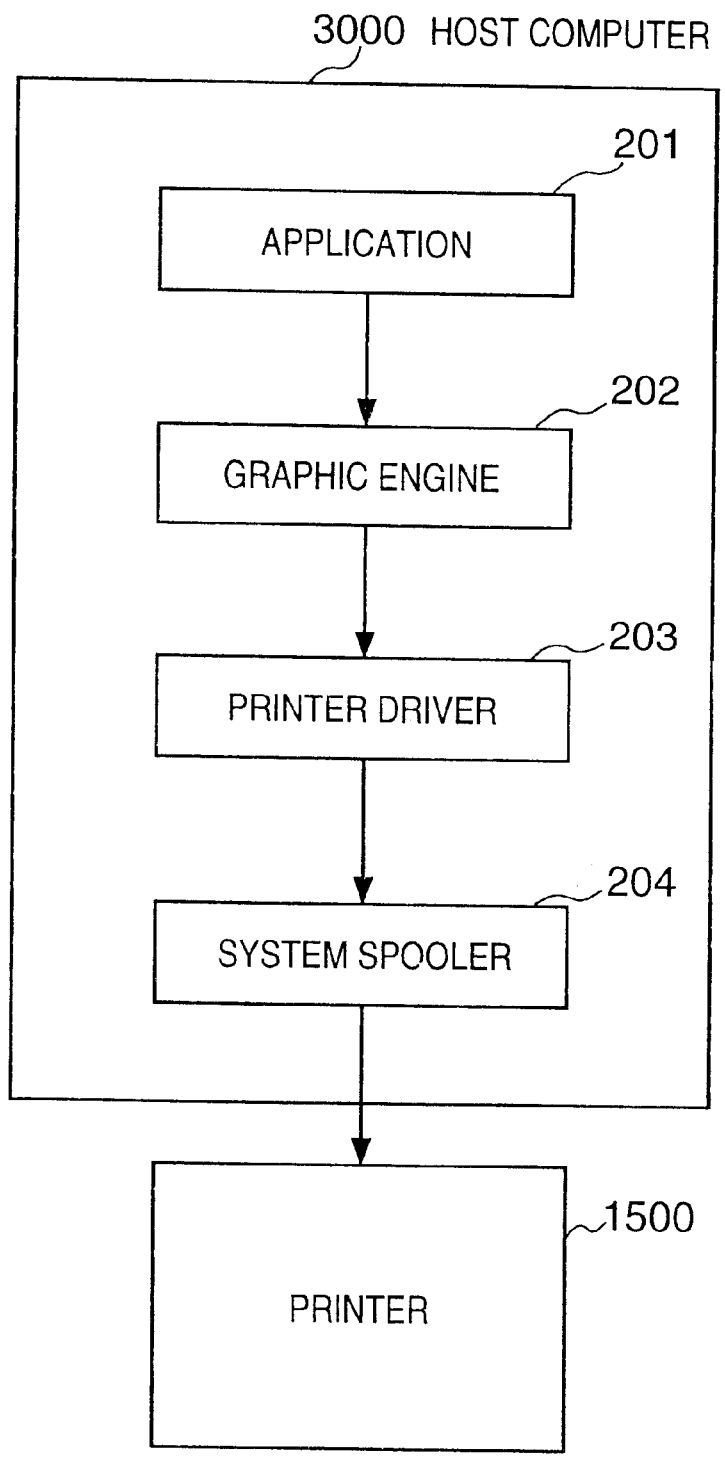
FIG. 2 is a diagram showing the generation of typical print data in a host computer.

FIG. 2 is a diagram showing typical printing processing executed by the host computer connected to a printing apparatus directly or via a network. An application 201, graphic engine 202, printer driver 203 and system spooler 204 are preserved in the external memory 11 as files. These are program modules which, when they are to be executed, are loaded in the RAM 2 and executed by the operating system and by modules which utilize these modules. The application 201 and the printer driver 203 can be stored on a floppy disk or CD-ROM of the external memory 11 or can be stored on the hard disk of the external memory 11 via a network, not shown.

The application 201 preserved in the external memory 11 can be executed upon being loaded in the RAM 2. When the application 201 performs printing using the printer 1500, output (plotting) is performed utilizing the graphic engine 202 capable of being executed upon being loaded in the RAM 2. The graphic engine 202 loads the printer driver 203, which is prepared for each printing apparatus, from the external memory 11 to the RAM 2 and converts the output from the application 201 to printer control commands using the printer driver 203. The printer control commands obtained by the conversion are output to the printer 1500 via the interface 21 by way of the system spooler 204 that has been loaded into the RAM 2 by the operating system.

Figure 3:
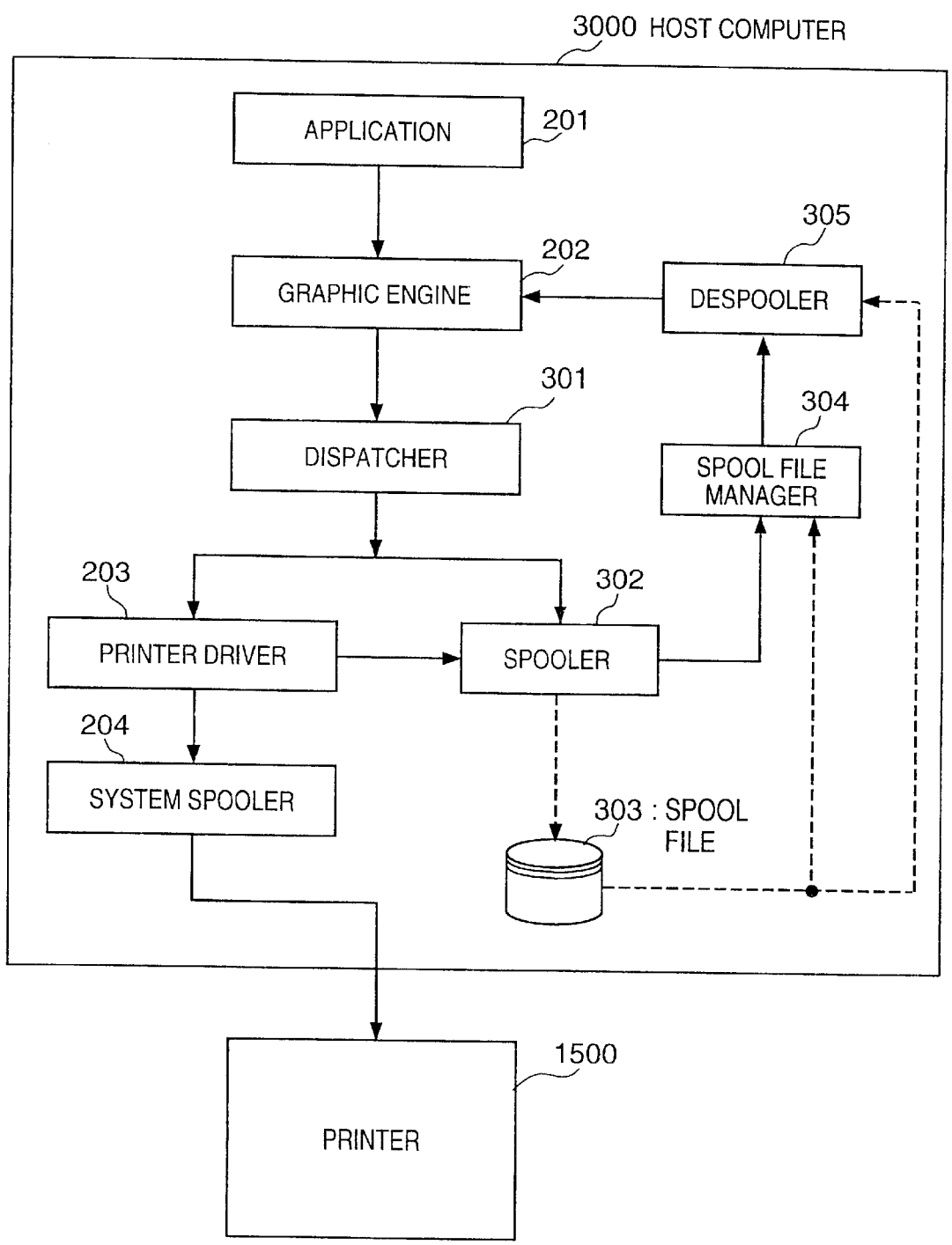
FIG. 3 is a diagram showing the generation of print data, which is an expansion of FIG. 2, for generating intermediate codes.

The printing system according to this embodiment has an arrangement which, as shown in FIG. 3, spools print data from the application temporarily by intermediate code data. This arrangement is provided in addition to the system comprising the printer and host computer shown in FIG. 2.

<Configuration of Printing Control System>

FIG. 3 is an expansion of the system of FIG. 2. Here a spool file 303 comprising intermediate codes is generated temporarily when a print instruction is sent from the graphic engine 202 to the printer driver 203. In the system of FIG. 2, the application 201 is freed from printing processing at the moment the printer driver 203 finishes converting all print instructions from the graphic engine 202 to printer control commands. In the system of FIG. 3, on the other hand, the application 201 is freed from printing processing at the moment a spooler 302 converts all print instructions to intermediate code data and outputs the code data to a spool file 303. Ordinarily the latter requires a shorter period of time. Further, in the system shown in FIG. 3, the content of the spool file 303 can be manipulated. As a result, it is possible to realize functions not possessed by the application. For example, the print data from the application can be subjected to size enlargement and reduction so that a plurality of pages may be printed upon being reduced to the size of a single page.

In order to attain these objectives, the system of FIG. 2 is expanded in such a manner that print data is spooled in the form of intermediate codes as shown in FIG. 3. In order to manipulate the print data, the operator usually makes settings using a setting screen provided by the printer driver 203 and the printer driver 203 saves the set content in the RAM 2 or external memory 11.

The details of FIG. 3 will now be described. As illustrated in FIG. 3, the processing scheme thus expanded is such that print instructions from the graphic engine 202 are accepted by a dispatcher 301. In a case where a print instruction that the dispatcher 301 has accepted from the graphic engine 202 is a print instruction that the application 201 issued to the graphic engine 202, the dispatcher 301 loads the spooler 302, which has been stored in the external memory 11, into the RAM 2 and sends the print instruction to the spooler 302 and not the printer driver 203.

The spooler 302 converts the accepted print instruction to an intermediate code and outputs the code to a spool file 303. Further, the spooler 302 acquires the manipulation settings, which relate to print data set in the printer driver 203, from the printer driver 203 and preserves the data in the spool file 303. Though the spool file 303 is generated as a file in the external memory 11, the file may be generated in the RAM 2. Furthermore, the spooler 302 loads a spool file manager 304, which has been stored in the external memory 11, into the RAM 2 and notifies the spool file manager 304 of the status of spool file generation. In accordance with the content of the manipulation settings relating to the print data preserved in the spool file 303, the spool file manager 304 subsequently determines whether printing can be performed. When the spool file manager 304 has judged that printing can be performed utilizing the graphic engine 202, the spool file manager 304 loads a despooler 305, which has been stored in the external memory 11, into the RAM 2 and instructs the despooler 305 to perform printing of the intermediate codes described in the spool file 303.

It should be noted that the spool file 303 is a file from which a desired page can be read. For example, this may be an indexed file in which one page serves as a record and the page number as a index of the page.

In accordance with the content of manipulation settings included in the spool file 303, the despooler 305 manipulates the intermediate codes contained in the spool file 303 and outputs them again via the graphic engine 202.

In a case where a print instruction which the dispatcher 301 receives from the graphic engine 202 is a print instruction sent from the despooler 305 to the graphic engine 202, the dispatcher 301 sends the print instruction to the printer driver 203 and not the spooler 302.

The printer driver 203 generates a print control command in dependence upon the received print instruction and outputs the command to the printer 1500 via the system spooler 204 and bidirectional interface 21.

<Construction of printer>

Figure 12:
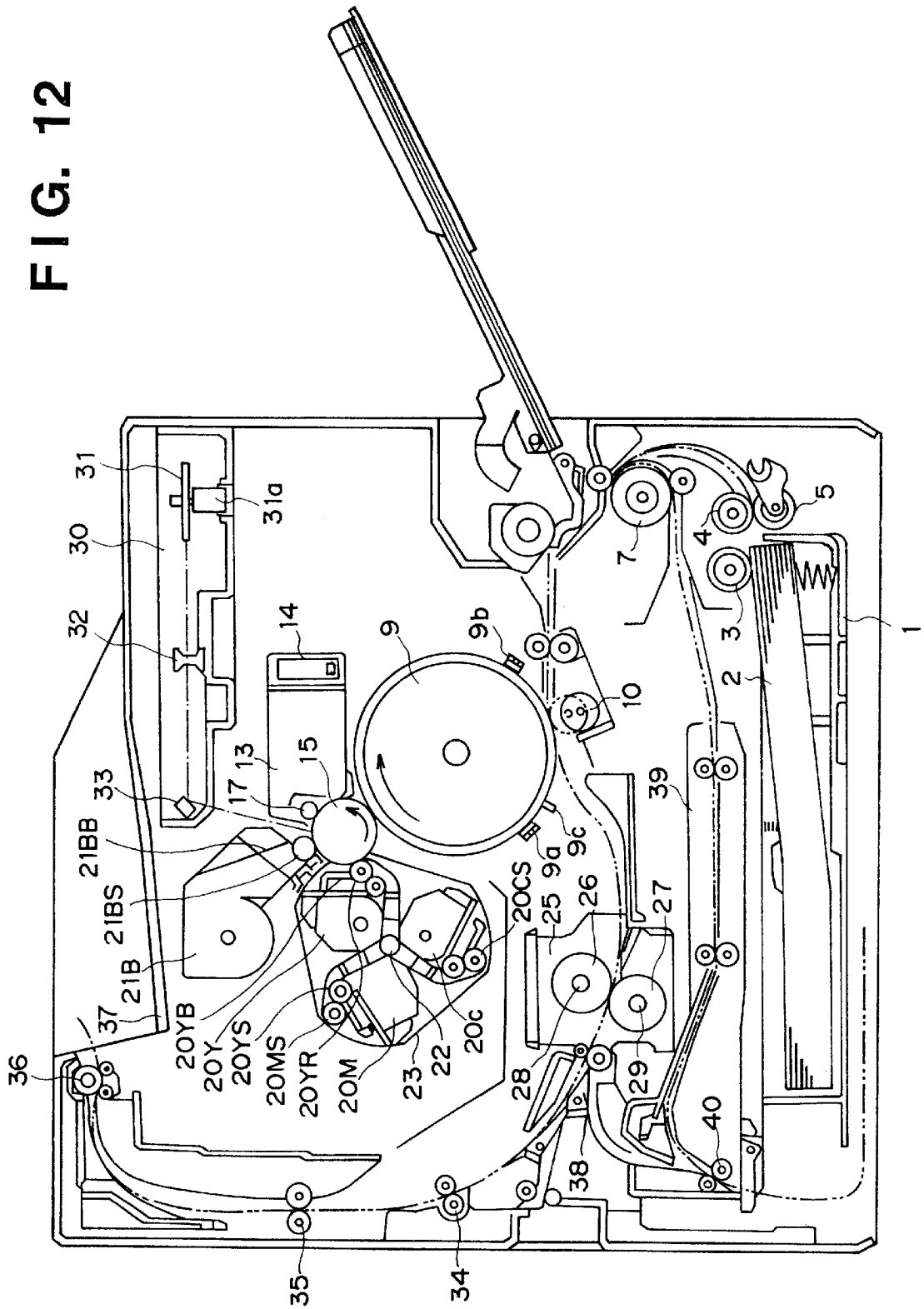
FIG. 12 is a sectional view of a laser printer having a double-sided printing unit.

FIG. 12 is a sectional view illustrating a color laser printer having a double-sided printing function and serving as one example of the printer 1500.

The printer is so adapted that a laser beam, which has been modulated by image data of color components obtained based upon print data entered from the host computer 3000, is scanned across a photosensitive drum 15 by a polygon mirror 31 to form electrostatic latent images. Visible images are obtained by developing the latent images using toner and the visible images for all colors are transferred to an intermediate transfer body 9 to obtain a full-color visible image. The visible color image is transferred to and fixed on a transfer medium 2. The image forming section that performs the above-described control is constituted by a drum unit 13 having the photosensitive drum 15, a primary charging unit having a contact-type charging roller 17, a cleaning unit, a developing unit, the intermediate transfer body 9, a paper cassette 1, a feed unit including various rollers 3, 4, 5, 7, a transfer unit having a transfer roller 10 and a fixing unit 25.

The drum unit 13 is constructed by integrating the photosensitive drum (photoreceptor) 15 and a cleaner container 14 having a cleaning mechanism that serves also as the holder of the photosensitive drum 15. The drum unit 13 is supported on the printer proper in a freely attachable and detachable manner and is capable of being replaced with ease when the photosensitive drum 15 reaches the end of its service life. The photosensitive drum 15 includes an aluminum cylinder the peripheral surface of which is coated with an organic photoconductor layer and is rotatably supported on the cleaner container 14. The photosensitive drum 15 is rotated by transmission of the driving force from a drive motor (not shown), the drive motor rotating the photosensitive drum 15 counter-clockwise in conformity with the image forming operation. The laser beam transmitted from a scanner 30 is made to selectively expose the surface of the photosensitive drum 15, thereby forming the latent image. The scanner 30 has a motor 31a by which the polygon mirror is rotated in synchronization with the horizontal synchronizing signal of the image signal, whereby the modulated laser beam is reflected to irradiate the photosensitive drum 15 via a lens 32 and reflecting mirror 33.

In order to make the electrostatic latent image a visible image, the developing unit has three color developing devices 20Y, 20M, 20C for developing the colors yellow (Y), magenta (M) and cyan (C), respectively, and a single black developing unit 21B for developing the color black (B). The color developing devices 20Y, 20M, 20C and black developing unit 21B are provided with sleeves 20YS, 20MS, 20CS and 21BS, respectively, and with coating blades 20YB, 20MB, 20CB and 21BB, respectively, which are in pressured contact with the outer peripheries of the respective sleeves 20YS, 20MS, 20CS, 20BS. The three color developing devices 20Y, 20M, 20C are further provided with coating rollers 20YR, 20MR, 20CR.

The black developer 21B is mounted on the printer proper in a freely attachable and detachable manner. The color developing devices 20Y, 20M, 20C are mounted, in a freely attachable and detachable manner, on a developing rotary 23 which rotates about a rotary shaft 22.

The sleeve 21BS of the black developing device 21B is spaced away from the photosensitive drum 15 by a minute distance of, say, 300 $\mu$m. The black developing device 21B transports toner by an internally provided feed member and an electric charge is applied to the toner by frictional charging in such a manner that the coating blade 21BB will coat the outer periphery of the sleeve 21B, which rotates in the clockwise direction, with the toner. Further, by applying a developing bias to the sleeve 21BS, the toner on the photosensitive drum 15 is developed in conformity with the electrostatic latent image, whereby a visible image is formed on the photosensitive drum 15 by the black toner.

The three color developing devices 20Y, 20M, 20C rotate along with the developing rotary 23 at the time of image formation so that the prescribed ones of the sleeves 20YS, 20MS, 20CS are made to oppose the surface of the photosensitive drum 15 across minutely small distances of 300 μm. As a result, the prescribed ones of the color developing devices 20Y, 20M, 20C are stopped at a developing position relative to the photosensitive drum 15 so that a visible image is formed on the photosensitive drum 15.

When the color image is formed, a developing process is executed whereby the developing rotary 23 is rotated per each revolution of the intermediate transfer body 9 so that development is performed by the yellow developing device 20Y, magenta developing device 20M, cyan developing device 20C and black developing device 20Y, in the order mentioned. The intermediate transfer body 9 makes four revolutions to successively form visible images using the yellow, magenta, cyan and black toners. As a result, a full-color visible image is formed on the intermediate transfer body 9.

The intermediate transfer body 9 is adapted to contact the photosensitive drum 15 and rotates attendant upon rotation of the photosensitive drum 15. The intermediate transfer body 9 rotates clockwise at the time of formation of the color image and receives transfer of the four visible images from the photosensitive drum 15. At the time of image formation, the transfer roller 10, described later, contacts the intermediate transfer body 9 and transports the transfer medium 2 embraced by the intermediate transfer body 9 and the transfer roller 10, whereby the visible color images on the intermediate transfer body 9 are transferred to the transfer medium 2 simultaneously. Disposed about the periphery of the intermediate transfer body 9 are a TOP sensor 9a and an RS sensor 9b, which sense the position of the intermediate transfer body 9, and a density sensor 9c for sensing the density of the toner image that has been transferred to the intermediate transfer body 9.

The transfer roller 10 has a transfer charging device supported so as to be capable of contacting and separating from the photosensitive drum 15. The transfer roller 10 is constructed by winding a foamed elastic body having intermediate resistance on a metal shaft.

As indicated by the solid line in FIG. 12, the transfer roller 10 is spaced away from the intermediate transfer body 9 so that the visible color images will not be disturbed during the multiple transfer of the visible color images to the intermediate transfer body 9. After the four visible color images have been formed on the intermediate transfer body 9, the transfer roller 10 is moved upward to the position indicated by the phantom line by a cam member (not shown) in conformity with the timing at which the visible color images are transferred to the transfer medium 2. As a result, the transfer roller 10 is brought into pressured contact, at a prescribed force, with the intermediate transfer body 9 via the intermediary of the transfer medium 2. In addition, a bias voltage is applied so that the visible color images on the intermediate transfer body 9 are transferred to the transfer medium 2.

The fixing unit 25, which fixes the transferred visible color images while transporting the transfer medium 2, has a fixing roller 26 for heating the transfer medium 2, and a pressurizing roller 27 for bringing the transfer medium 2 into pressured contact with the fixing roller 26. The fixing roller 26 and the pressurizing roller 27 are formed to be hollow and internally incorporate heaters 28, 29, respectively. That is, the transfer medium 2 bearing the visible color images is transported, heated and pressurized by the fixing roller 26 and pressurizing roller 27, whereby the toners are fixed on the surface of the transfer medium 2.

The fixed transfer medium 2 is subsequently ejected to a discharge unit by discharge rollers 34, 35, 36, whereby the image forming operation is completed.

Cleaning means cleans residual toner from the photosensitive drum 15 and intermediate transfer body 9. Toner waste left after the visible toner images formed on the photosensitive drum 15 are transferred to the intermediate transfer body 9 or toner waste left after the four visible color images formed on the intermediate transfer body 9 are transferred to the transfer medium 2 is collected in the cleaner container 15.

The transfer medium (printing paper) 2 to be printed on is extracted from the paper cassette 1 by a feed roller 3 and is transported so as to be embraced by the intermediate transfer body 9 and transfer roller 10, whereby a color toner image is recorded on the paper. The toner image is then fixed by passing the paper through the fixing unit 25. In case of single-sided printing, a guide 38 defines a transport path that leads the printing paper to the overlying paper discharge section. If the printing paper is to undergo double-sided printing, the guide 38 forms a path that leads the printing paper to the underlying double-sided printing unit.

Printing paper that has been introduced to the double-sided printing unit first is fed into an area below the cassette 1 (see the transport path indicated by the two-dot broken line) by a transport roller 40, after which the printing paper is transported in the reverse direction and sent to a duplex tray 39. The printing paper received in the duplex tray 39 will be upside down relative to the printing paper stacked in the paper cassette 1 and its orientation in terms of the transport direction will have been reversed. By performing transfer and fixing of a toner image again under these conditions, double-sided printing can be performed.

<Method of bookbinding printing>

Figure 4:
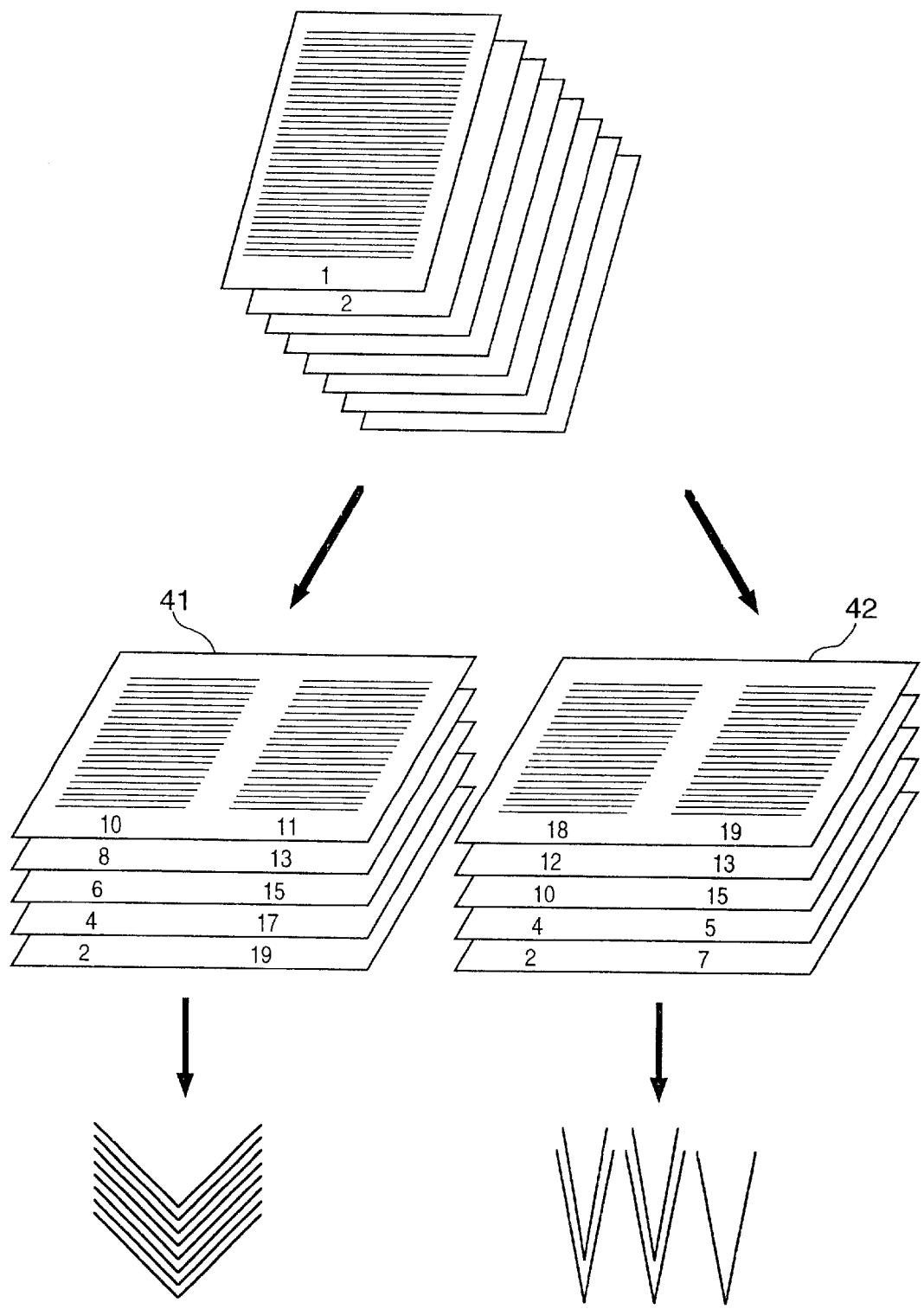
FIG. 4 is a diagram useful in describing bookbinding printing as well as the results of implementing the same.

FIG. 4 is a diagram useful in describing bookbinding printing as well as the results of implementing the same. By bookbinding printing, a document are printed on both sides of paper so that pages will be in numerical order when the printed papers will be folded in half. There are two methods of achieving this.

1. When all pages to be printed are treated as a single block

In this case, an output such as printed matter 41 in FIG. 4 is obtained. These sheets are folded in half collectively to form a book. The bookbinding block mentioned here represents how many sheets of paper that have been output are to be collected together and folded at a time to perform bookbinding printing.

2. When an arbitrary number of pages are treated as a single block.

In this case, an output such as printed matter 42 in FIG. 4 is obtained. These sheets are folded in half block by block and are then combined to form the book. The printed matter 42 is printed so that a book is formed by stacking two sheets at a time from the bottom, folding the two sheets in half and then combining the folded sheets. In other words, one block in this case is composed of two sheets.

Figure 5:
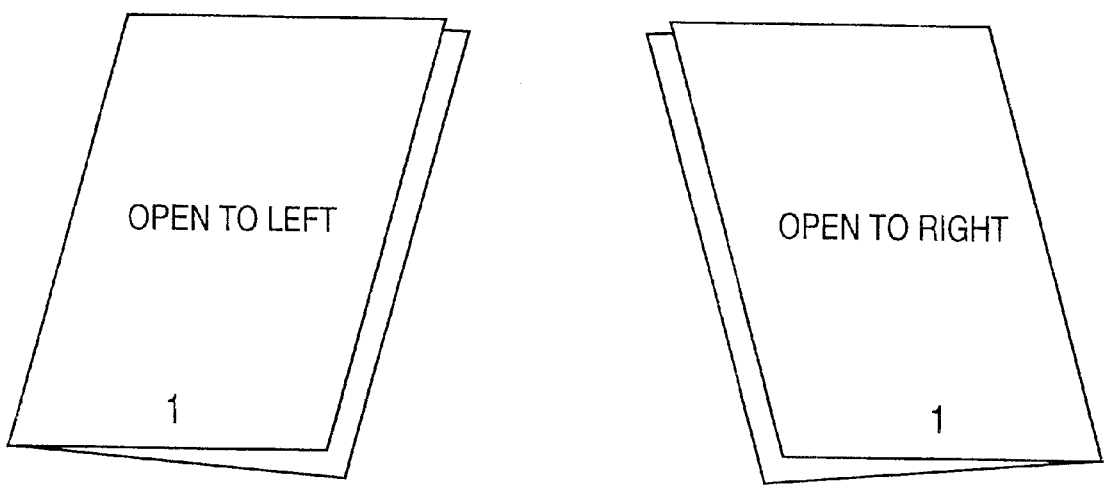
FIG. 5 is a diagram useful in describing a binding format output by bookbinding printing.

Further, bookbinding formats output by bookbinding printing also include the following two cases, as illustrated in FIG. 5:

1. Pages are arranged in ascending order from the left (book opens to the left)
2. Pages are arranged in ascending order from the right (book opens to the right)

In a case where pages to be printed are turned sideways (landscape), the sheets are merely rotated and the order of the pages is not changed.

The printing system according to this embodiment is capable of performing printing in conformity with any of the bookbinding printing methods set forth above.

<Printing control procedure>

Figure 6:
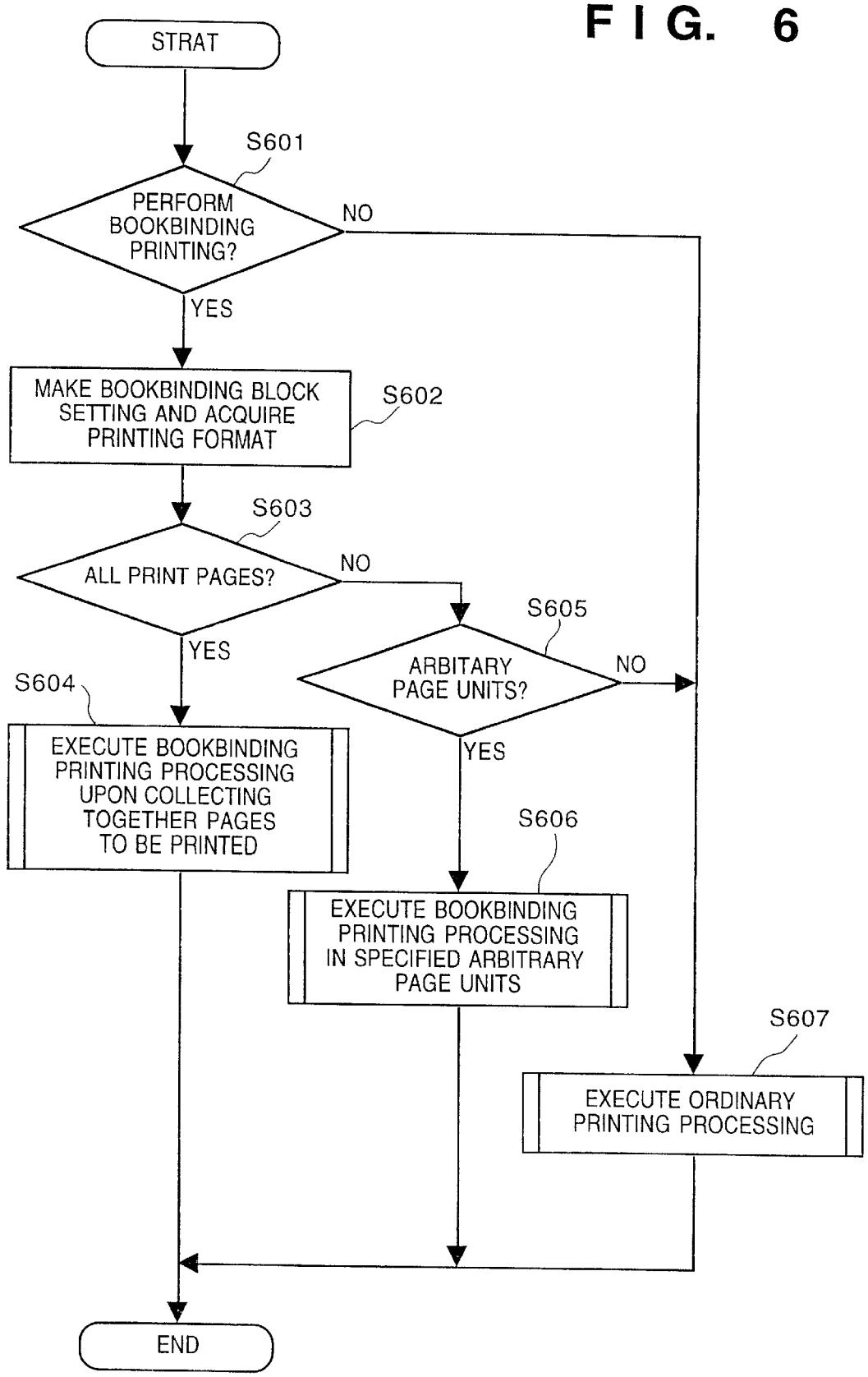
FIG. 6 is a flowchart showing a procedure for controlling bookbinding printing.

The processing for bookbinding printing will now be described in detail with reference to the drawings from FIG. 6 onward. FIGS. 6 through 11 illustrate a control procedure executed by the spool file manager 304.

When the spool file manager 304 judges that printing can be started, the processing of FIG. 6 begins.

If the user has made a bookbinding printing setting at step 601, control proceeds to step 602. If the decision at step 601 is "NO", then control proceeds to step 607, at which ordinary printing is carried out.

A setting relating to the bookbinding printing block and a setting relating to the printing format, namely the bookbinding printing, is acquired at step 602.

The following selections are available for block settings:

1. Bookbinding printing in which all pages to be printed are treated collectively as one group (collective bookbinding printing)
2. Bookbinding printing in which units of a specified number of pages are treated as individual groups (block bookbinding printing)

Further, the following selections are available as printing format settings:

1. Book opens to the left
2. Book opens to the right

If all pages have been selected as a bookbinding printing block at step 603, control proceeds to step 604; otherwise, control proceeds to step 605.

The bookbinding printing block is set to all printing pages and bookbinding printing is performed at step 604. The details of this processing will be described later.

If a specific number of pages has been selected as the bookbinding printing block at step 605, control proceeds to step 606; otherwise, it is construed that ordinary printing is to be performed at control proceeds to step 607.

Bookbinding printing is performed at step 606 in accordance with the block setting specified. The details of this processing will be described later.

Ordinary print processing is executed at step 607. In ordinary printing, print data that has been created by an application is sent to the printer and is printed thereby in the order in which the pages where created.

It should be noted that the bookbinding printing and block settings are made on the basis of inputs by the operator using the host computer 3000.

<Collective bookbinding printing processing>

The processing relating to step 604 in FIG. 6 will be described in detail using FIGS. 7 and 8.

Figure 7:
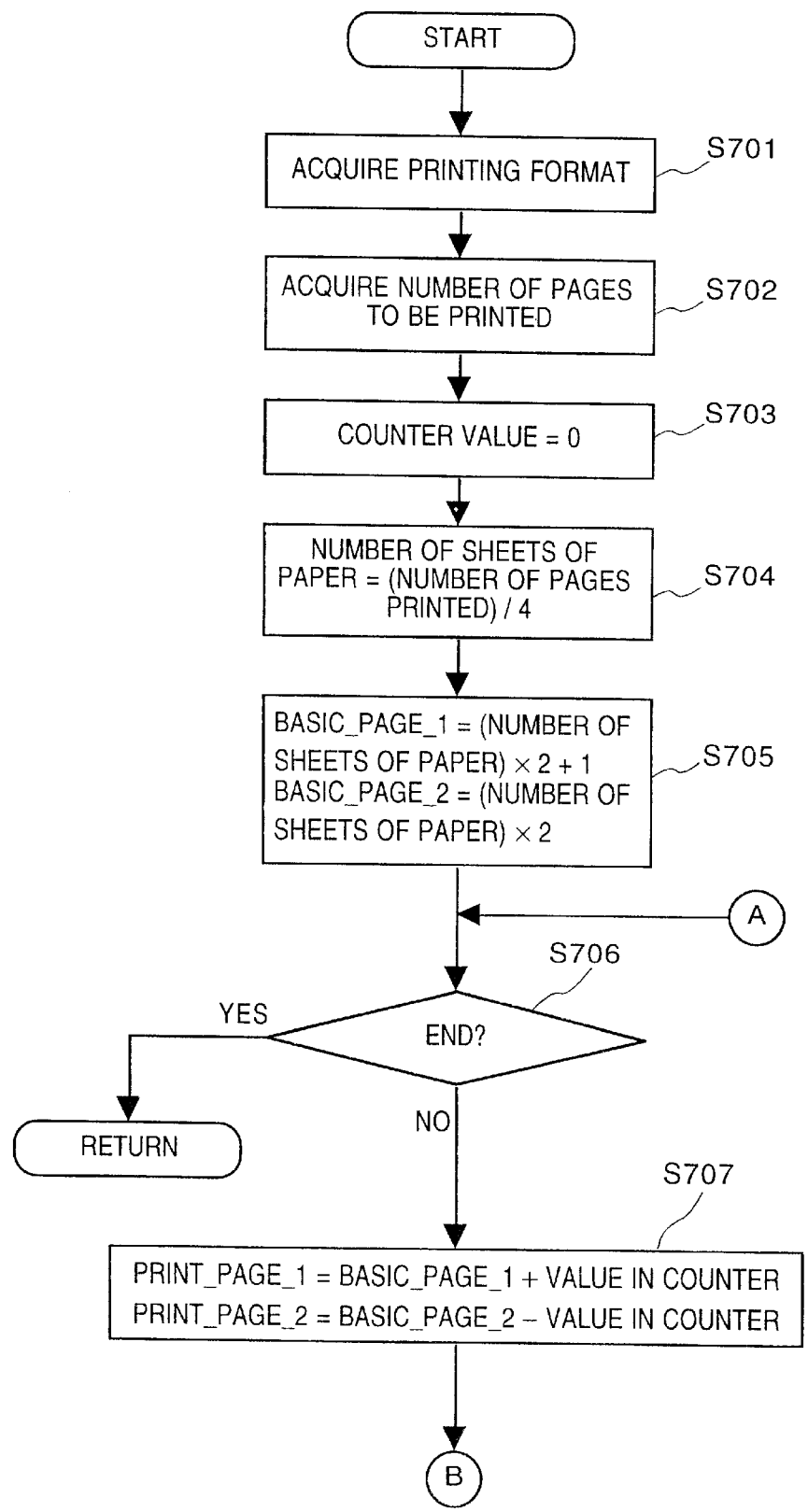
FIG. 7 is a flowchart for describing a method of performing bookbinding printing upon collecting all pages together.

The printing format is acquired at step 701 in FIG. 7.

This is followed by step 702, at which the number of pages to be printed is acquired. It is possible to acquire these pages at the moment all print data from the application is finished being spooled.

A bookbinding printing incrementing counter is set to zero at step 703. When the count in this counter is an even number, printing is performed in such a manner that the page to be printed will be on the inside when the sheets of paper are folded in half. When the count in this counter is an odd number, printing is performed in such a manner that the page to be printed will be on the outside when the sheets of paper are folded in half.

Next, at step 704, the number of sheets of paper used is computed in accordance with the following equation:

number of sheets of paper=(number of pages)/4(fractions below the decimal point are rounded up)

Next, at step 705, the page numbers of two pages to be printed on the innermost sides when the printed papers will be folded into bookform is computed using the equations below. The pages that will be printed following these two pages are calculated on the basis of these two pages. The calculated two page numbers are called basic pages.

basic_page_1=(number of sheets of paper)×2+1 basic_page_2=(number of sheets of paper)×2

For example, assume that 50 pages of print data have been sent from the application. The number of sheets of paper used in bookbinding printing in this case will 50÷4=13. The basic pages printed on the innermost sides when the sheets of paper are folded in half are as follows: basic_page_1= 13×2÷1=page 27, basic_page_2=13×2=page 26. In the example of FIG. 4, the 11th page and the 10th page, which constitute the side of the sheet incorporated innermost of the printed matter 41 when the sheets are folded, correspond to these basic pages.

When it is found at step 706 that bookbinding printing has been completed, processing is terminated. If it is found at step 706 that bookbinding printing has not been completed, then control proceeds to step 707.

Two pages to be printed side by side on one side of the printing paper are computed in accordance with the following equations:

print_page_1=basic_page_1+value in the counter print_page_2=basic_page_2−value in the counter Since the value in the counter is initially zero, the basic pages constitute the first printed page. In a case where 50 pages are to be printed and bound, the pages included on the second printed page (when the value in the counter has become equal to one) are 27+1=page 28 and 26−1=page 25. Thus, whenever the counter is incremented, the print_ page_1 and print_page_2 change so as to become pages 29 and 24, respectively, then pages 30 and 33, respectively, and so on.

Figure 8:
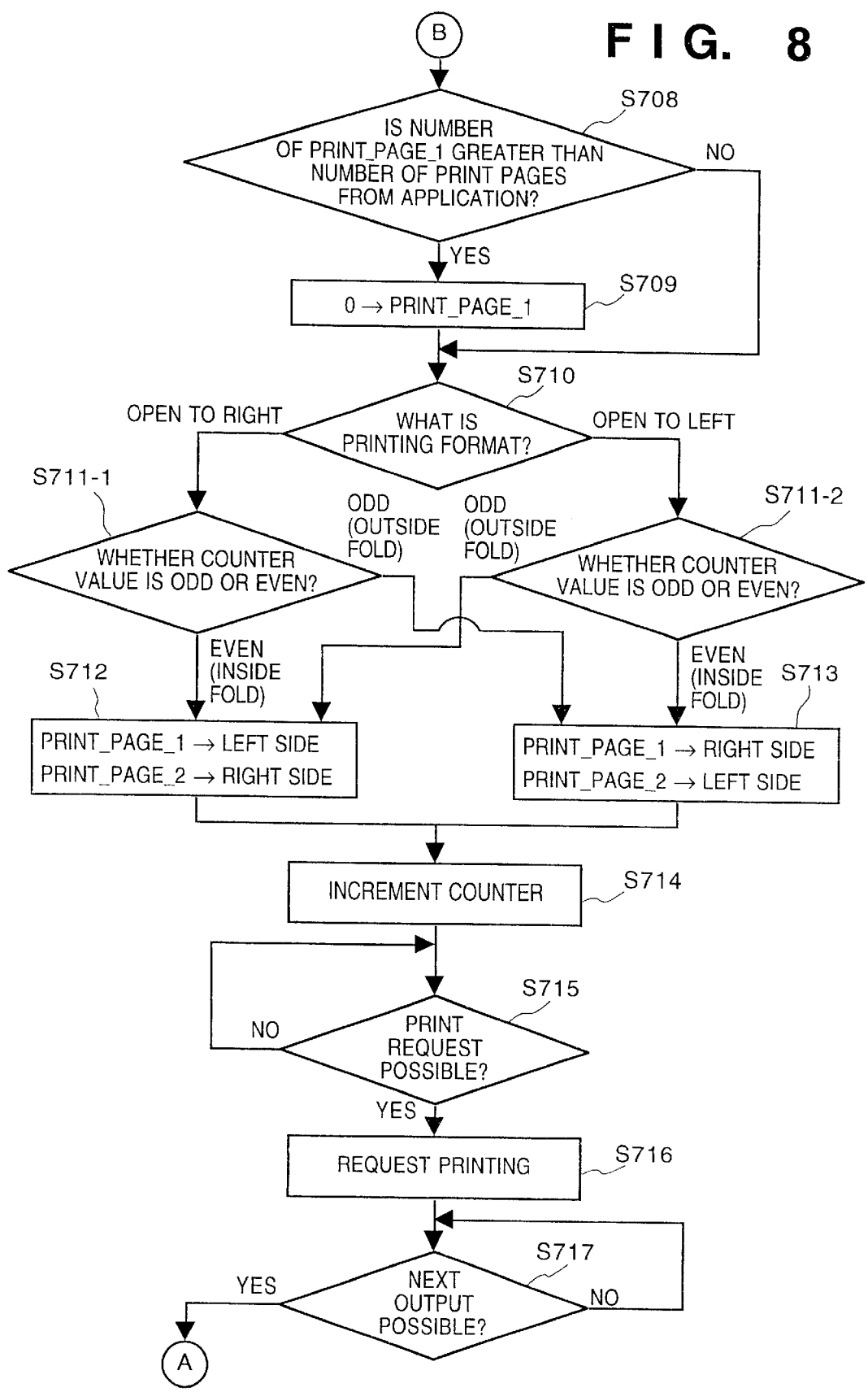
FIG. 8 is a flowchart that is a continuation of the flowchart of FIG. 7.

This is followed by step 708 in FIG. 8, at which it is determined whether the print_page_1 calculated has a page number greater than the number of print pages from the application. If the answer is "YES", the print page 1 is treated as a blank space and control proceeds to step 709. If the answer at step 708 is "NO", then control skips to step 710.

Since the print page 1 will constitute a blank space at step 709, here page number 0, for example, which represents a blank space, is substituted for print_page_1.

This is followed by step 710 and either step 711-1 or 711-2, which decide the arrangement of two pages represented by the print_page_1 and print_page_2 calculated based upon the bookbinding format (whether the book opens to the left or opens to the right) and the value in the counter (whether the counter value is odd or even). More specifically, the two pages indicated by the print_page_1 and print_page_2 are judged to be on the inside if the value in the counter is even and on the outside if the value in the counter is odd. For example, the first two pages are judged to be on the inside since the value in the counter at this point is zero, an even number. Processing proceeds as follows as the result of the decisions rendered at steps 710, 711-1, 711-2:

to step 713 if the book opens to the left and the counter value is even;

to step 712 if the book opens to the left and the counter value is odd;

to step 712 if the book opens to the right and the counter value is even; and to step 713 if the book opens to the right and the counter value is odd.

A page indicated by the print_page_1 is placed on the left side and a page indicated by the print_page_2 on the right side at step 712.

A page indicated by the print_page_1 is placed on the right side and a page indicated by the print_page_2 on the left side at step 713.

If print_page_1=0 is found to hold at steps 712, 713, the portion of the paper on which the page indicated by print_page_1 is disposed is left blank.

The processing from step 710 to step 713 prints page 25 on the reverse side of page 26 and page 28 on the reverse side of page 27, by way of example.

The counter is incremented by one at step 714.

It is determined at step 715 whether a subsequent print request is possible. Control proceeds to step 716 if the request is possible or to step 717 if it is not. The apparatus waits until the next print request becomes possible.

A request to print one side of a sheet printing paper is issued at step 716 in regard to a print page whose disposition has been completed.

This is followed by step 717, at which it is determined whether a request for output of the next page is possible. Control proceeds to step 706 if the request is possible. If the request is not possible, the system waits until it is possible.

The printed matter thus printed and output need only be folded in half in the stacked state to accomplish binding.

<Block bookbinding print processing>

The processing relating to step 606 in FIG. 6 will now be described in detail with reference to FIGS. 9 and 10.

The block referred to here indicates how many sheets are incorporated at a time when bookbinding printing is performed. For example, in a case where 40 pages of print data from the application are printed in units of two sheets at a time, two sheets of paper folded in half serve as one block and eight pages of data are placed in one block. Accordingly, bookbinding printing is carried out by dividing all of the print data into five blocks.

Figure 9:
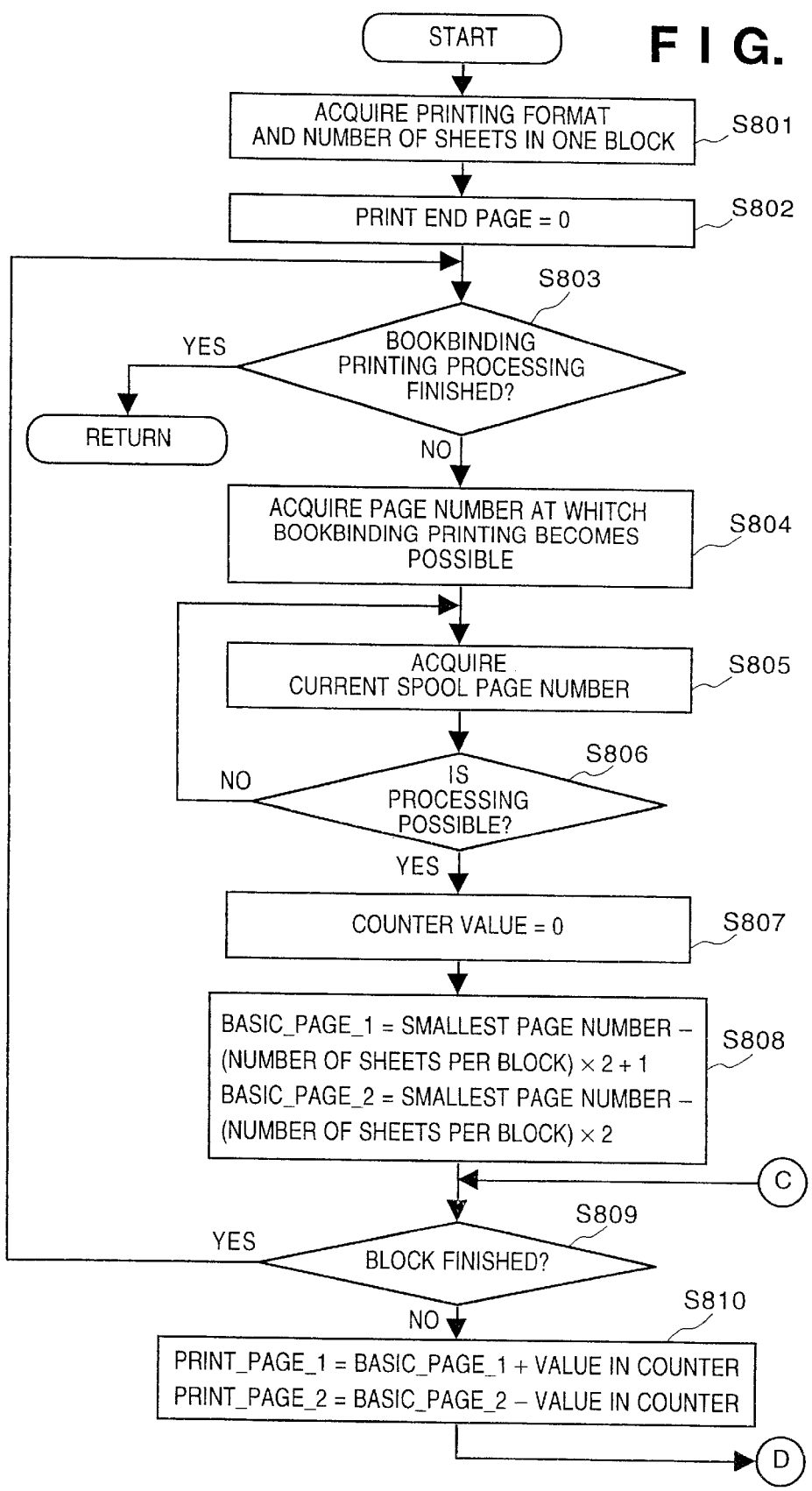
FIG. 9 is a flowchart for describing a method of performing bookbinding printing in which an arbitrary number of sheets of paper serves as one block.

The printing format and the number of sheets in one block are acquired at step 801 in FIG. 9. The page that completes printing is set to zero at step 802. This is followed by step 803, at which it is determined whether bookbinding printing processing is finished. If the answer is "YES", processing is terminated. If the a answer is "NO", then control proceeds to step 804.

The smallest page number necessary to execute block bookbinding print processing is acquired at step 804. The smallest page number obtained at step 804 is the smallest page number in the block. The smallest number of pages in the initial block is obtained as follows:

smallest page number=(number of sheets per block)×4

In regard to the blocks from the second onward, the smallest page number is obtained as follows:

smallest page number=(smallest page number of preceding block)+(number of pages included in the block)×4

For example, in a case where a document having 40 pages is printed with one block including two sheets, the smallest page number in the initial block will be 2×4=page 8 and the smallest page number in the next block will be 8+2×4=page 16. This will be followed by page 24, page 32 and page 40 as the smallest page numbers.

The page number for which spooling has been completed is acquired at step 805.

This is followed by step 806, at which it is determined whether spooling has been completed up to the print page (the smallest page number) at which binding printing processing becomes possible or whether the spooling of all pages has been completed. Control proceeds to step 807 if processing is possible and returns to step 805 if processing is not possible.

The counter is set to zero at step 807. This is followed by step 808, at which two basic pages to be printed on a side of a sheet of paper that will be innermost when the paper has been folded in half are computed using the following equations:

basic_page_1=smallest page number−(number of sheets per block)×2+1 basic_page_2=smallest page number−(number of sheets per block)×2

It is determined at step 809 whether the request to print the current block is finished. Control proceeds to step 803 if the answer is "YES" and to step 810 if the answer is "NO". More specifically, it is judged that the printing request is finished if the value of the count in the counter has become equal to the number of sheets per block.

This is followed by step 810, at which two pages for which printing is to be requested are computed in accordance with the following equations:

print_page_1=basic_page_1+value in counter print_page_2=basic_page_2−value in counter Since the value in the counter is initially zero, the basic pages 1, 2 constitute the first printed page.

Figure 10:
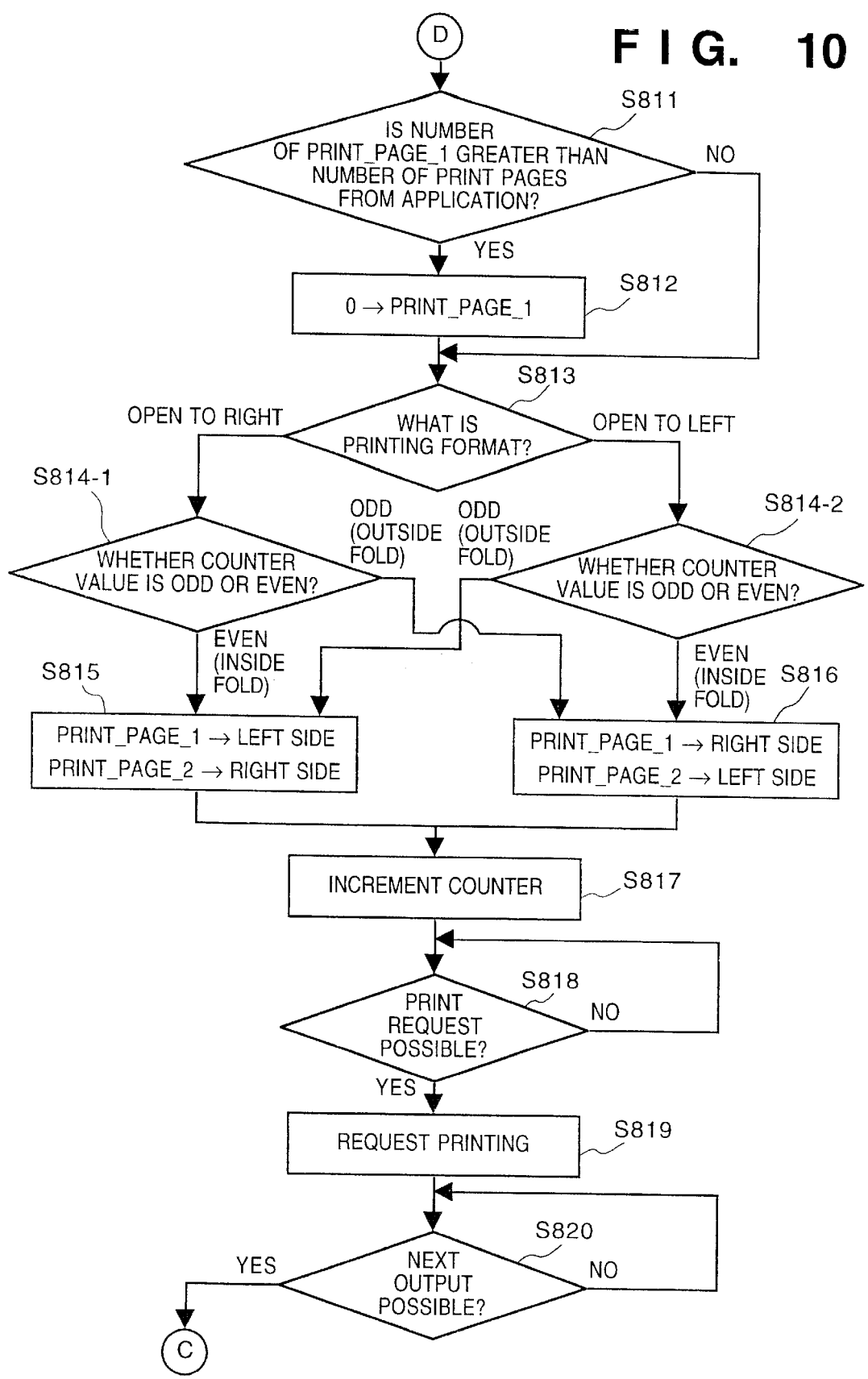
FIG. 10 is a flowchart that is a continuation of flowchart of FIG. 9.

This is followed by step 811 in FIG. 10, at which it is determined whether the page numbers indicated by the print_page_1 and print_page_2 calculated are greater than the number of pages that the application has requested be printed. If the answer is "YES", the print pages are treated as blank spaces and control proceeds to step 812. If the answer at step 811 is "NO", then control skips to step 813.

If the page number to be printed is greater than the number of pages that the application has requested, then a blank space will be placed here. Accordingly, page number 0, for example, which represents a blank space, is substituted for print_page_1 and print page_2, whose page numbers are greater than the number of pages to be printed.

This is followed by step 813 and either step 814-1 or 814-2, which decide the arrangement of two pages (whether placement is on the inside or outside when the sheets are folded in half) calculated based upon the bookbinding format (whether the book opens to the left or opens to the right) and the value in the counter. More specifically, placement is judged to be on the inside if the value in the counter is even and on the outside if the value in the counter is odd. For example, the first two pages are judged to be on the inside since the value in the counter at this point is zero, an even number. Processing proceeds as follows as the result of the decisions rendered at steps 813, 814-1, 814-2:

to step 816 if the book opens to the left and the counter value is even;

by to step 815 if the book opens to the left and the counter value is odd;

to step 815 if the book opens to the right and the counter value is even; and to step 816 if the book opens to the right and the counter value is odd.

A page indicated by the print_page_1 is placed on the left side and a page indicated by the print_page_2 on the right side at step 815.

A page indicated by the print_page_1 is placed on the right side and a page indicated by the print_page_2 on the left side at step 816. However, if print_page_1=0 holds at steps 815, 816, then a blank space is placed here.

The counter is incremented by one at step 817.

It is determined at step 818 whether a subsequent print request is possible. Control proceeds to step 819 if the request is possible. If the print request is not possible, then the apparatus waits until the next print request becomes possible.

A request to print one side of a sheet printing paper is issued at step 820 in regard to a print page whose disposition has been completed.

If double-sided printing by the printer 1500 is performed in response to a print request issued through the foregoing procedure, the sheets obtained as the printout need only be folded in half every desired block and combined to create printed matter bound in the form of a book. As a result, the labor required of the operator is reduced and the user is provided with a greater degree of freedom in terms of selection.

[Second Embodiment]

Consider the case where all pages from an application have been spooled and then printed and bound on block-by-block basis. If the number of pages to be printed it the final block is small in this case, bookbinding printing processing is executed so that a number of sheets smaller than the specified number will serve as one block. This is executed only in regard to the final block. This makes it possible to reduce the amount of paper used. For example, in a case where the number of sheets per block is two and the number of remaining pages is three, five pages will be blank. However, if the number of sheets per block is changed to one, then only on page will be blank and the number of sheets of paper used can be reduced by one.

Figure 11:
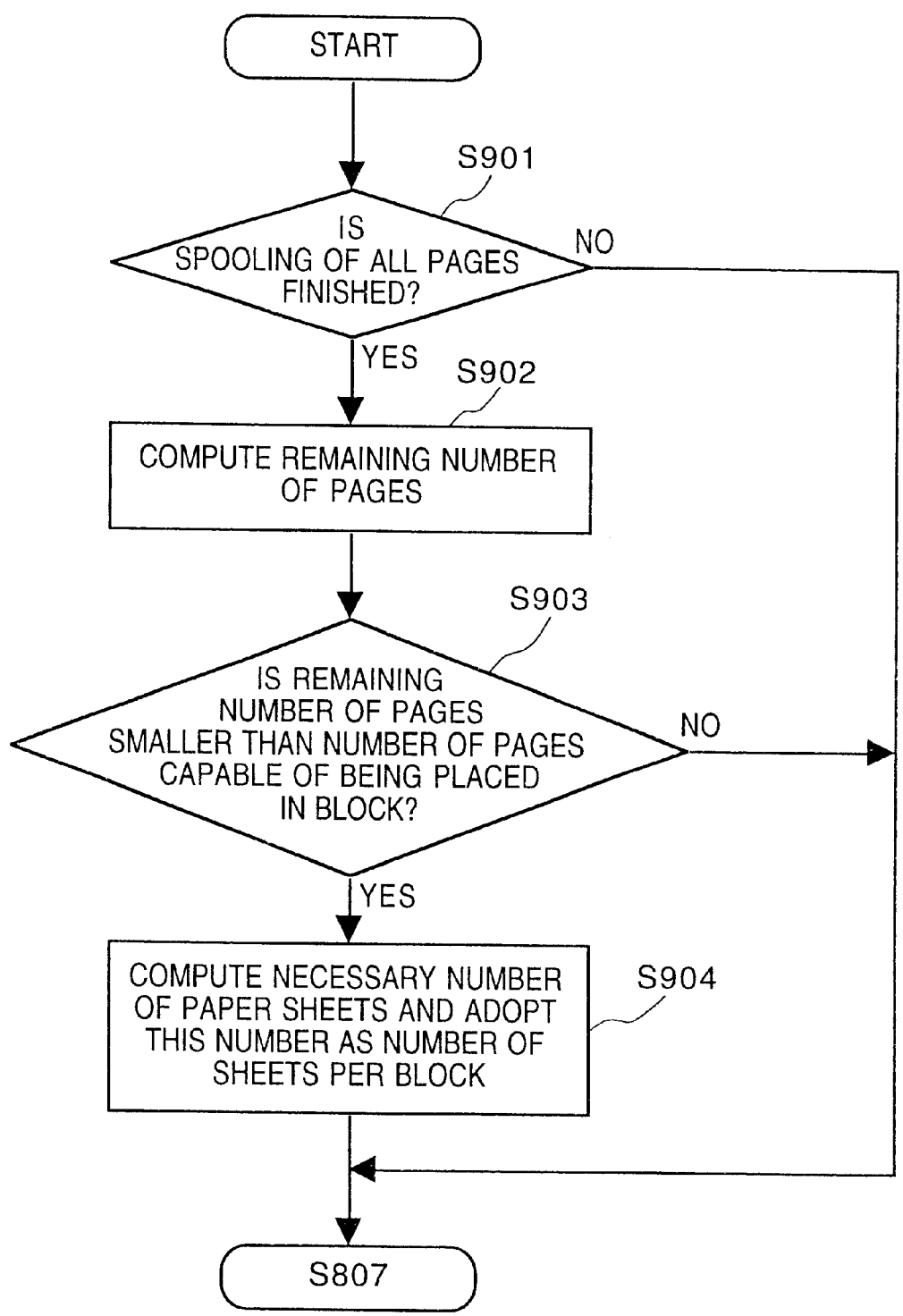
FIG. 11 is a flowchart for describing a method of conserving paper.

Processing for adjusting the number of sheets in the final block will be described in detail with reference to FIG. 11. This processing is applied also to a case where a block that is larger than necessary has been specified in regard to a printed page. For example, in a case where bookbinding printing has been specified such that ten sheets serve as one block in regard to 30 pages of print data from the application, the number of sheets of paper actually required is 30÷4=8 sheets. In a case such as this, the number of sheets per block is adjusted from ten to eight. This provides an output result the same as that in a case where bookbinding printing is performed over an entire page.

The processing set forth below will make it possible to achieve the reduction in number of sheets of paper if the processing is executed between steps 806 and 807 in FIG. 9 in a case where a "YES" decision (meaning that processing is possible) is rendered at step 806.

First, it is determined at step 901 whether the spooling of all pages is finished. Control proceeds to step 902 if the answer is "YES" and to step 807 if the answer is "NO". The reason for this is that the processing of this embodiment cannot be executed unless the spooling of all pages has been completed.

The remaining number of pages is computed at step 902 in accordance with the following equation:

number of remaining pages=number of print pages requested by application−current smallest page number The current smallest page number means, smallest page number necessary to execute block bookbinding printing at the time. The number of pages contained in the currently set block is compared with the remaining number of pages at step 903. If the number of remaining pages is smaller, control proceeds to step 904. If the number of remaining pages is not smaller, it is construed that adjustment processing is not necessary and control proceeds to step 807.

The smallest number of sheets of paper on which the remaining pages will fit is obtained at step 904 in accordance with the following equation:

new number of sheets per block=number of remaining pages÷4
(fractions below the decimal point are rounded up)

If the last block is printed from step 807 onward using the new block thus obtained, the number of blank pages will be three at most. Four or more pages, namely blank pages on one or more sheets of paper, are no longer output. As a result, printing paper is not wasted. In addition, the number of printed pages is reduced as well, thereby shortening the time required for printout.

[Third Embodiment]

In order to conserve paper in the final block as in the second embodiment in a case where bookbinding printing processing is executed in block units, it is necessary to issue a print request after the spooling of all pages from the application is finished. On the other hand, if processing for conserving paper in the final block is not executed, it is possible to start the print request without waiting for the end of spooling of all pages in the block. As a result, printing required to output the first sheet of printing paper can be shortened. Further, by starting printing processing earlier, overall throughput can be increased. In the second embodiment, it is decided to reduce (conserve) blank pages depending upon whether or not the spooling of all pages has been completed. In this embodiment, however, blank pages are conserved if such conservation of paper is designated.

Figure 13:
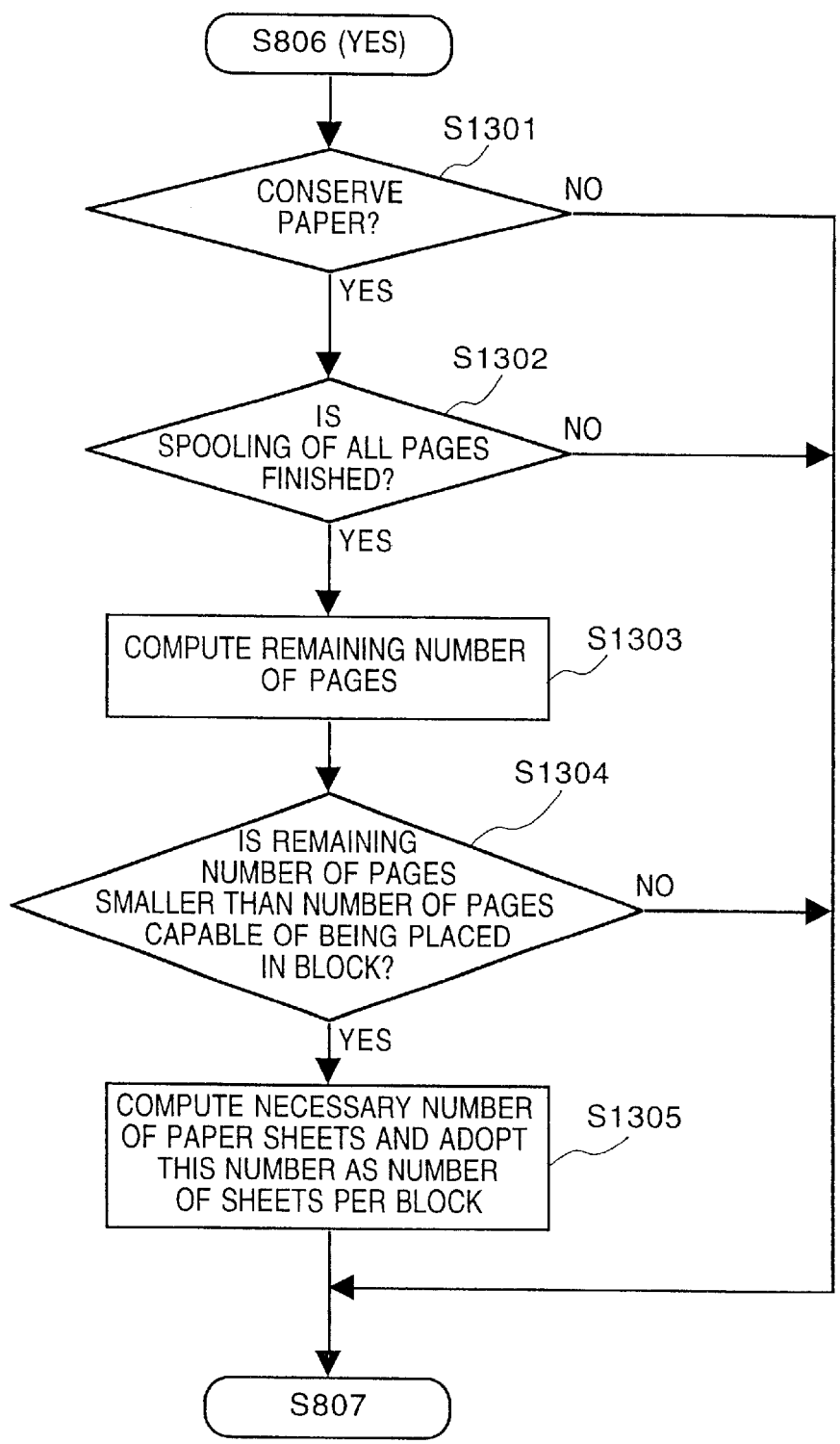
FIG. 13 is a flowchart showing a procedure for selecting whether paper conservation measures are to be taken in a third embodiment of the invention.

FIG. 13 is a flowchart illustrating the procedure for conserving paper according to this embodiment. This processing decides, depending upon whether paper in the final block is to be conserved, whether it is necessary to wait for the end of spooling of all pages in the block. If conservation of paper in the final block is not to be carried out, a printing request may be initiated without waiting for the end of spooling of all pages in the block. The processing of FIG. 13 is inserted between step 806 ("YES") and step 807 in FIG. 9. This processing is the result of adding a step 1301, which is for determining whether paper is to be conserved, to the beginning of the procedure shown in FIG. 11 of the second embodiment. That is, if paper is to be conserved, processing is executed in a manner similar to that of the second embodiment. If paper is not to be conserved, then processing is executed in a manner similar to that of the first embodiment. By way of example, the criterion used at step 1301 may be data that the operator is allowed to specify from the keyboard 9 of the host computer 3000 and that has been stored in the RAM 2.

If paper is not to be conserved, the print request can be initiated without waiting for the end of spooling of all pages in the block. At step 804 in FIG. 9 in the first and second embodiments, the smallest page number for when printing of the initial block is started is obtained at "(number of sheets per block)×4". In this case, therefore, this can be replaced by "(number of sheets per block)×2+1".

For example, consider a case where 40 pages are to be printed and bound with two sheets of paper serving as one block. If the system is to wait for the spooling of all pages of the block, then the system waits for the completion of spooling of 4×2=page 8. On the other hand, if paper is not to be conserved, the page at which bookbinding printing is judged to be possible in the initial block is 2×2+1=page 5. In other words, printing can be started three pages earlier. For subsequent blocks, "(smallest page number of preceding block)+(number of sheets per block)×4" will hold in all cases. This means that printing will be completed three pages earlier.

Figure 14:
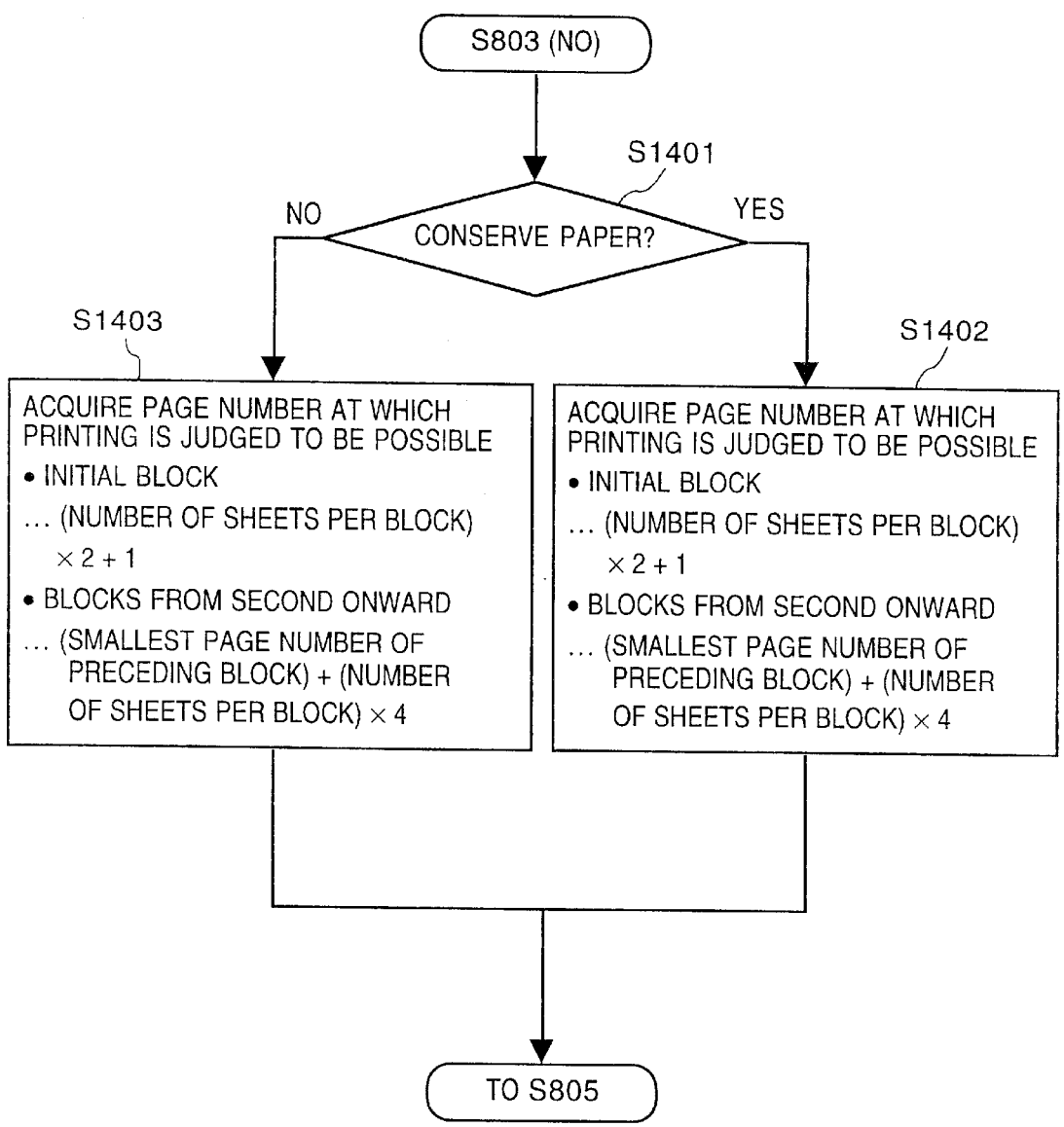
FIG. 14 is a flowchart showing a procedure for setting a page at which bookbinding printing is judged to be possible in the third embodiment.

FIG. 14 is a flowchart of a procedure in which step 804 of FIG. 9 has been replaced. If paper need not be conserved, the smallest page number at which printing is judged to be possible is obtained as follows at step 1403:

Initial block smallest page number=(number of sheets per block)×2+1

Blocks from second block onward smallest page number=(smallest page number of preceding block)+(number of sheets per block)×4

If paper is to be conserved, the page number at which printing is judged to be possible is obtained as follows at step 1402:

Initial block page number=(number of sheets per block)×4

Blocks from second block onward page number=(smallest page number of preceding block)+(number of sheets per block)×4

By virtue of the above-described processing, it is possible to initiate a print request without waiting for the spooling of all pages in a block in a case where it is unnecessary to conserve paper in the final block. As a result, printing time needed to output the first sheet of the printing medium can be shortened. The larger the number of sheets per block in bookbinding printing, the greater the time-curtailing effect. Further, by initiating the print request earlier, the overall throughput of printing processing can be raised.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing the program codes of the software for performing the aforesaid functions of the foregoing embodiments to a system or an apparatus, reading the program codes with a computer (e.g., a CPU or MPU) of the system or apparatus from the storage medium, and then executing the program.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system or the like working on the computer performs a part of or the entire process in accordance with the designation of program codes and implements the functions according to the embodiments.

The present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

Thus, in accordance with the present invention, as described above, bookbinding printing in conformity with user preference is made possible and the labor involved in binding printouts can be reduced.

Further, the operator is provided with a greater degree of freedom in terms of selections that can be made at the time of bookbinding printing.

In addition, paper can be conserved and printing throughput can be increased.

As many apparently widely different embodiments of the present invention can be made without departing from the spirit and scope thereof, it is to be understood that the invention is not limited to the specific embodiments thereof except as defined in the appended claims.

What is claimed is:

1. An information apparatus as a host computer for generating a print job including printer control commands, comprising:

input means for inputting a bookbinding setting for determining how a layout of book form is executed;

spooling means for spooling print data in storage means so that the print data can be read out in a desired sequence in units of individual pages;

layout means for deciding, in accordance with the bookbinding setting, layout of pages of the print data to be sent to the printing apparatus; and generation means for reading print data out of the storage means in a sequence that is in accordance with the layout decided by said layout means, and generating printer control commands in accordance with the layout to be outputted to the printing apparatus.

2. The apparatus according to claim 1, wherein said layout means decides a layout of pages in such a manner that the number of sheets of the printing medium will be the minimum for which bookbinding is possible.

3. The apparatus according to claim 1, wherein, in a case where said input means has input a first value as a bookbinding setting, said layout means lays out pages on the printing medium in such a manner that when all printouts are folded in half, the pages will be in numerical order.

4. The apparatus according to claim 1, wherein, in a case where said input means has input a second value as a bookbinding setting, said layout means lays out pages on the printing medium in such a manner that when printouts on a prescribed number of sheets are folded in half, the pages will be in numerical order.

5. The apparatus according to claim 4, further comprising resetting means for changing the prescribed number of sheets to such a number that blank pages will be one page at most in a case where remaining number of pages to be printed is less than the prescribed number of sheets.

6. The apparatus according to claim 1, wherein the bookbinding setting includes orientation information for setting whether bound pages open to the right or open to the left, and said layout means decides the layout of pages in conformity with the orientation information.

7. The apparatus according to claim 6, wherein said generation means causes the printing apparatus to perform double-sided printing.

8. The apparatus according to claim 5, wherein the bookbinding setting includes information as to whether paper is to be conserved, and said resetting means resets the layout of pages in a case where paper is to be conserved.

9. The apparatus according to claim 1, wherein said layout means lays out pages in such a manner that of pages capable of being laid out in units which constitute folds at the time pages are bound, pages that correspond to an innermost one of the folds are printed out in numerical order.

10. The apparatus according to claim 1, wherein the bookbinding setting further includes information as to whether paper is to be conserved, and in a case where paper is not to be conserved, printout is started if inside pages have been completed.

11. An information processing method for controlling an information apparatus as a host computer for generating print job including printer control commands, comprising:
   an input step of inputting a bookbinding setting for determining how a layout of book form is executed;
   a spooling step of spooling print data in storage means so that the print data can be read out in a desired sequence in units of individual pages;
   a layout step of deciding, in accordance with the i bookbinding setting, layout of pages of the print data to be sent to the printing apparatus; and
   a generation step of reading out print data from the storage means in a sequence that is in accordance with the layout decided by said layout step, and generating printer control commands in accordance with the layout to be outputted to the printing apparatus.

12. The method according to claim 11, wherein said layout step includes deciding a layout of pages in such a manner that the number of sheets of the printing medium will be the minimum for which bookbinding is possible.

13. The method according to claim 11, wherein, in a case where a first value has been input as a bookbinding setting in said input step, said layout step includes laying out pages on the printing medium in such a manner that when all printouts are folded in half, the pages will be in numerical order.

14. The method according to claim 11, wherein, in a case where a second value has been input as a bookbinding setting in said input step, said layout step includes laying out pages on the printing medium in such a manner that when printouts on a prescribed number of sheets are folded in half, the pages will be in numerical order.

15. The method according to claim 14, further comprising a resetting step of changing the prescribed number of sheets to such a number that blank pages will be one page at most in a case where remaining number of pages to be printed is less than the prescribed number of sheets.

16. The method according to claim 11, wherein the bookbinding setting includes orientation information for setting whether bound pages open to the right or open to the left, and said layout step includes deciding the layout of pages in conformity with the orientation information.

17. The method according to claim 16, wherein said output step includes causing the printing apparatus to perform double-sided printing.

18. The method according to claim 15, wherein the bookbinding setting includes information as to whether paper is to be conserved, and said resetting step includes resetting the layout of pages in a case where paper is to be conserved.

19. The method according to claim 11, wherein said layout step includes laying out pages in such a manner that of pages capable of being laid out in units which constitute folds at the time pages are bound, pages that correspond to an innermost one of the folds are printed out in numerical order.

20. The method according to claim 11, wherein the bookbinding setting further includes information as to whether paper is to be conserved, and in a case where paper is not to be conserved, printout is started if inside pages have been completed.

21. An information processing system comprising as a host computer for generating print job including printer control commands and a printing control apparatus connected to the printing apparatus, the system having:
   input means for inputting a bookbinding setting for determining how a layout of book form is executed;
   spooling means for spooling print data in storage means so that the print data can be read out in a desired sequence in units of individual pages;
   layout means for deciding, in accordance with the bookbinding setting, layout of pages of the print data to be sent to the printing apparatus; and
   generation means for reading print data out of the storage means in a sequence that is in accordance with the layout decided by said layout means, and generating printer control commands in accordance with the layout to be outputted to the printing apparatus,
   wherein the printing apparatus prints on both sides of the printing medium in the sequence sent from said generation means.

22. An information processing medium storing a program by which the following means are implemented by a computer connected to an information apparatus as a host computer for generating print job including printer control commands:
   input means for inputting a bookbinding setting for determining how a layout of book form is executed;
   spooling means for spooling print data in storage means so that the print data can be read out in a desired sequence in units of individual pages;
   layout means for deciding, in accordance with the bookbinding setting, layout of pages of the print data to be sent to the printing apparatus; and
   generation means for reading print data out of the storage means in a sequence that is in accordance with the layout decided by said layout means, and generating printer control commands in accordance with the layout to be outputted to the printing apparatus.

23. The storage medium according to claim 22, wherein said layout means decides a layout of pages in such a manner that the number of sheets of the printing medium will be the minimum for which bookbinding is possible.

24. The storage medium according to claim 22, wherein, in a case where said input means has input a first value as a bookbinding setting, said layout means lays out pages on the printing medium in such a manner that when an all printouts are folded in half, the pages will be in numerical order.

25. The storage medium according to claim 22, wherein, in a case where said input means has input a second value as a bookbinding setting, said layout means lays out pages on the printing medium in such a manner that when printouts on a prescribed number of sheets are folded in half, the pages will be in numerical order.

26. The storage medium according to claim 25, wherein said program further implements resetting means for changing the prescribed number of sheets to such a number that blank pages will be one page at most in a case where remaining number of pages to be printed is less than the prescribed number of sheets.

27. The storage medium according to claim 22, wherein the bookbinding setting includes orientation information for setting whether bound pages open to the right or open to the left, and said layout means decides the layout of pages in conformity with the orientation information.

28. The storage medium according to claim 27, wherein said generation means causes the printing apparatus to perform double-sided printing.

29. The storage medium according to claim 27, wherein the bookbinding setting includes information as to whether paper is to be conserved, and said resetting means resets the layout of pages in a case where paper is to be conserved.

30. The storage medium according to claim 22, wherein said layout means lays out pages in such a manner that of pages capable of being laid out in units which constitute folds at the time pages are bound, pages that correspond to an innermost one of the folds are printed out in numerical order.

31. The storage medium according to claim 22, wherein the bookbinding setting further includes information as to whether paper is to be conserved, and in a case were paper is not to be conserved, printout is started if inside pages have been completed.

32. A computer program product by which the following means are implemented by a computer connected to an information apparatus as a host computer for generating print job including printer control commands:
   input means for inputting a bookbinding setting for determining how a layout of book form is executed;
   spooling means for spooling print data in storage means so that the print data can be read out in a desired sequence in units of individual pages;
   layout means for deciding, in accordance with the bookbinding setting, layout of pages of the print data to be sent to the printing apparatus; and
   generation means for reading print data out of the storage means in a sequence that is in accordance with the layout decided by said layout means, and generating printer control commands in accordance with the layout to be outputted to the printing apparatus.

33. The program product according to claim 32, wherein said layout means decides a layout of pages in such a manner that the number of sheets of the printing medium will be the minimum for which bookbinding is possible.

34. The program product according to claim 32, wherein, in a case where said input means has input a first value as a bookbinding setting, said layout means lays out pages on the printing medium in such a manner that when an all printouts are folded in half, the pages will be in numerical order.

35. The program product according to claim 32, wherein, in a case where said input means has input a second value as a bookbinding setting, said layout means lays out pages on the printing medium in such a manner that when printouts on a prescribed number of sheets are folded in half, the pages will be in numerical order.

36. The program product according to claim 35, wherein said program further implements resetting means for changing the prescribed number of sheets to such a number that blank pages will be one page at most in a case where remaining number of pages to be printed is less than the prescribed number of sheets.

37. The program product according to claim 32, wherein the bookbinding setting includes orientation information for setting whether bound pages open to the right or open to the left, and said layout means decides the layout of pages in conformity with the orientation information.

38. The program product according to claim 37, wherein said generation means causes the printing apparatus to perform double-sided printing.

39. The program product according to claim 37, wherein the bookbinding setting includes information as to whether paper is to be conserved, and said resetting means resets the layout of pages in a case where paper is to be conserved.

40. The program product according to claim 32, wherein said layout means lays out pages in such a manner that of pages capable of being laid out in units which constitute folds at the time pages are bound, pages that correspond to an innermost one of the folds are printed out in numerical order.

41. The program product according to claim 32, wherein the bookbinding setting further includes information as to whether paper is to be conserved, and in a case were paper is not to be conserved, printout is started if inside pages have been completed.

42. An information apparatus as a host computer for generating a print job including printer control commands, comprising:
   an inputter, adapted to input a bookbinding setting for determining how a layout of book form is executed;
   a spooling unit, adapted to spool print data in storage means so that the print data can be read out in a desired sequence in units of individual pages;
   a layout unit, adapted to decide, in accordance with the bookbinding setting, layout of pages of the print data to be sent to the printing apparatus; and
   a generation unit, adapted to read print data out of the storage means in a sequence that is in accordance with the layout decided by said layout unit, and generating printer control commands in accordance with the layout to be outputted to the printing apparatus.

43. The apparatus according to claim 42, wherein said layout unit decides a layout of pages in such a manner that the number of sheets of the printing medium will be the minimum for which bookbinding is possible.

44. The apparatus according to claim 42, wherein, in a case where said input unit has input a first value as a bookbinding setting, said layout unit lays out pages on the printing medium in such a manner that when all printouts are folded in half, the pages will be in numerical order.

45. The apparatus according to claim 42, wherein, in a case where said input unit has input a second value as a bookbinding setting, said layout unit lays out pages on the printing medium in such a manner that when printouts on a prescribed number of sheets are folded in half, the pages will be in numerical order.

46. The apparatus according to claim 45, further comprising a resetting unit adapted to change the prescribed number of sheets to such a number that blank pages will be one page at most in a case where remaining number of pages to be printed is less than the prescribed number of sheets.

47. The apparatus according to claim 42, wherein the bookbinding setting includes orientation information for setting whether bound pages open to the right or open to the left, and said layout unit decides the layout of pages in conformity with the orientation information.

48. The apparatus according to claim 47, wherein said generation unit causes the printing apparatus to perform double-sided printing.

49. The apparatus according to claim 46, wherein the bookbinding setting includes information as to whether paper is to be conserved, and said resetting unit resets the layout of pages in a case where paper is to be conserved.

50. The apparatus according to claim 42, wherein said layout unit lays out pages in such a manner that of pages capable of being laid out in units which constitute folds at the time pages are bound, pages that correspond to an innermost one of the folds are printed out in numerical order.

51. The apparatus according to claim 42, wherein the bookbinding setting further includes information as to whether paper is to be conserved, and in a case where paper is not to be conserved, printout is started if inside pages have been completed.

52. A print control apparatus for outputting print data to a printing apparatus, comprising:

input means for inputting a bookbinding setting indicating one of collective bookbinding printing in which all sheets to be printed are treated collectively as one group and block book binding printing in which units of a specified number of sheets are treated as individual groups;

spooling means for spooling print data in storage means so that the print data can be read out in a desired sequence in units of individual pages;

layout deciding means for deciding layout of pages of the print data in accordance with the bookbinding setting so that the layout decided according to the collective bookbinding printing and the layout decided according to the block book binding are different from each other; and reading means for reading print data out of the storage means in a sequence that is in accordance with the layout decided by said layout means to output the print data to the printing apparatus.

53. The apparatus according to claim 52, wherein, in a case where said input means has input the book binding setting indicating the collective bookbinding printing, said layout deciding means decides the layout of pages on the printing medium in such a manner that when all printouts are folded in half, the pages are in numerical order.

54. The apparatus according to claim 52, wherein, in a case where said input means has input the book binding setting indicating block book binding printing, said layout deciding means decides the layout of pages on the printing medium in such a manner that when printouts on a prescribed number of sheets are folded in half, the pages are in numerical order.

55. The apparatus according to claim 52, wherein the bookbinding setting further indicates orientation information for setting whether bound pages open to the right or open to the left, and said layout deciding means decides the layout of pages in conformity with the orientation information.

56. A print control method for outputting print data to a printing apparatus, comprising the steps of:

inputting a bookbinding setting indicating one of collective bookbinding printing in which all sheets to be printed are treated collectively as one group and block book binding printing in which units of a specified number of sheets are treated as individual groups;

spooling print data in storage means so that the print data can be read out in a desired sequence in units of individual pages;

deciding layout of pages of the print data in accordance with the bookbinding setting so that the layout decided according to the collective bookbinding printing and the layout decided according to the block book binding are different from each other; and reading print data out of the storage means in a sequence that is in accordance with the layout decided in said layout deciding step to output the print data to the printing apparatus.

57. The method according to claim 56, wherein, in a case where the book binding setting indicating the collective bookbinding printing has been input in said inputting step, said layout deciding step includes deciding the layout of pages on the printing medium in such a manner that when all printouts are folded in half, the pages are in numerical order.

58. The method according to claim 56, wherein, in a case where the book binding setting indicating block book binding printing has been input in said inputting step, said layout deciding step includes deciding the layout of pages on the printing medium in such a manner that when printouts on a prescribed number of sheets are folded in half, the pages are in numerical order.

59. The method according to claim 56, wherein the bookbinding setting further indicates orientation information for setting whether bound pages open to the right or open to the left, and said layout deciding step includes deciding the layout of pages in conformity with the orientation information.

60. An information processing medium storing a program by which the following means are implemented by a print control apparatus including printer control commands:

input means for inputting a bookbinding setting indicating one of collective bookbinding printing in which all sheets to be printed are treated collectively as one group and block book binding printing in which units of a specified number of sheets are treated as individual groups;

spooling means for spooling print data in storage means so that the print data can be read out in a desired sequence in units of individual pages;

layout deciding means for deciding layout of pages of the print data in accordance with the bookbinding setting so that the layout decided according to the collective bookbinding printing and the layout decided according to the block book binding are different from each other; and reading means for reading print data out of the storage means in a sequence that is in accordance with the layout decided by said layout means to output the print data to the printing apparatus.

61. The information processing medium according to claim 60, wherein, in a case where said input means has input the book binding setting indicating the collective bookbinding printing, said layout deciding means decides the layout of pages on the printing medium in such a manner that when all printouts are folded in half, the pages are in numerical order.

62. The information processing medium according to claim 60, wherein, in a case where said input means has input the book binding setting indicating block book binding printing, said layout deciding means decides the layout of pages on the printing medium in such a manner that when printouts on a prescribed number of sheets are folded in half, the pages are in numerical order.

63. The information processing medium according to claim 60, wherein the bookbinding setting further indicates orientation information for setting whether bound pages open to the right or open to the left, and said layout deciding means decides the layout of pages in conformity with the orientation information.

64. A program product storing a program by which the following means are implemented by a print control apparatus including printer control commands:

input means for inputting a bookbinding setting indicating one of collective bookbinding printing in which all sheets to be printed are treated collectively as one group and block book binding printing in which units of a specified number of sheets are treated as individual groups;

spooling means for spooling print data in storage means so that the print data can be read out in a desired sequence in units of individual pages;

layout deciding means for deciding layout of pages of the print data in accordance with the bookbinding setting so that the layout decided according to the collective bookbinding printing and the layout decided according to the block book binding are different from each other; and reading means for reading print data out of the storage means in a sequence that is in accordance with the layout decided by said layout means to output the print data to the printing apparatus.

65. The program product according to claim 64, wherein, in a case where said input means has input the book binding setting indicating the collective bookbinding printing, said layout deciding means decides the layout of pages on the printing medium in such a manner that when all printouts are folded in half, the pages are in numerical order.

66. The program product according to claim 64, wherein, in a case where said input means has input the book binding setting indicating block book binding printing, said layout deciding means decides the layout of pages on the printing medium in such a manner that when printouts on a prescribed number of sheets are folded in half, the pages are in numerical order.

67. The program product according to claim 64, wherein the bookbinding setting further indicates orientation information for setting whether bound pages open to the right or open to the left, and said layout deciding means decides the layout of pages in conformity with the orientation information.

68. A print control apparatus for outputting print data to a printing apparatus, comprising:

an input unit, adapted to input a bookbinding setting indicating one of collective bookbinding printing in which all sheets to be printed are treated collectively as one group and block book binding printing in which units of a specified number of sheets are treated as individual groups;

a spooling unit, adapted to spool print data in storage means so that the print data can be read out in a desired sequence in units of individual pages;

a layout unit, adapted to decide layout of pages of the print data in accordance with the bookbinding setting so that the layout decided according to the collective bookbinding printing and the layout decided according to the block book binding are different from each other; and a reader, adapted to read print data out of the storage means in a sequence that is in accordance with the layout decided by said layout unit to output the print data to the printing apparatus.

69. The apparatus according to claim 68, wherein, in a case where said input unit has input the book binding setting indicating the collective bookbinding printing, said layout unit decides the layout of pages on the printing medium in such a manner that when all printouts are folded in half, the pages are in numerical order.

70. The apparatus according to claim 68, wherein, in a case where said input unit has input the book binding setting indicating block book binding printing, said layout unit decides the layout of pages on the printing medium in such a manner that when printouts on a prescribed number of sheets are folded in half, the pages are in numerical order.

71. The apparatus according to claim 68, wherein the bookbinding setting further indicates orientation information for setting whether bound pages open to the right or open to the left, and said layout unit decides the layout of pages in conformity with the orientation information.

72. A print control apparatus outputting print data to a printing apparatus, comprising:

input means for inputting a bookbinding setting indicating block book binding printing in which units of a specified number of sheets will be bound collectively;

spooling means for spooling print data in storage means so that the print data can be read out in a desired sequence in units of individual pages;

layout deciding means for deciding layout of pages of the print data so that a number of sheets smaller than the specified number will be bound as one unit if the number of pages to be printed in the final unit is smaller than a number of pages that can be arranged on the specified number of sheets; and reading means for reading print data out of the storage means in a sequence that is in accordance with the layout decided by said layout deciding means to output the print data to the printing apparatus.

73. The apparatus according to claim 72, wherein, if the number of pages that can be arranged on one unit is 4N and the number of pages to be arranged in the final unit is represented by (4N–4k), where N is a positive integer and k is a positive number, said layout deciding means decides the layout of pages so that the number of sheets of the final unit to be bound is reduced to (N–k') where k' is an integer obtained by rounding up the value of k.

74. The apparatus according to claim 73, further comprising determination means for determining, according to designation by the operator, whether the specified number N or the reduced number N–k is utilized as the number of sheets in the final unit.

75. A print control method for outputting print data to a printing apparatus, comprising the steps of:

inputting a bookbinding setting indicating block book binding printing in which units of a specified number of sheets will be bound collectively;

spooling print data in storage means so that the print data can be read out in a desired sequence in units of individual pages;

deciding layout of pages of the print data so that a number of sheets smaller than the specified number will be bound as one unit if the number of pages to be printed in the final unit is smaller than a number of pages that can be arranged on the specified number of sheets; and reading print data out of the storage means in a sequence that is in accordance with the layout decided in said layout deciding step to output the print data to the printing apparatus.

76. The method according to claim 75, wherein, if the number of pages that can be arranged on one unit is 4N and the number of pages to be arranged in the final unit is represented by (4N–4k), where N is a positive integer and k is a positive number, said layout deciding step includes deciding the layout of pages so that the number of sheets of the final unit to be bound is reduced to (N–k'), where k' is an integer obtained by rounding up the value of k.

77. The method according to claim 76, further comprising the step of determining, according to designation by the operator, whether the specified number N or the reduced number N–k is utilized as the number of sheets in the final unit.

78. An information processing medium storing a program by which the following means are implemented by a computer, comprising:

input means for inputting a bookbinding setting indicating block book binding printing in which units of a specified number of sheets will be bound collectively;

spooling means for spooling print data in storage means so that the print data can be read out in a desired sequence in units of individual pages;

layout deciding means for deciding layout of pages of the print data so that a number of sheets smaller than the specified number will be bound as one unit if the number of pages to be printed in the final unit is smaller than a number of pages that can be arranged on the specified number of sheets; and reading means for reading print data out of the storage means in a sequence that is in accordance with the layout decided by said layout deciding means to output the print data to the printing apparatus.

79. The information processing medium according to claim 78, wherein, if the number of pages that can be arranged on one unit is 4N and the number of pages to be arranged in the final unit is represented by (4N–4k), where N is a positive integer and k is a positive number, said layout deciding means decides the layout of pages so that the number of sheets of the final unit to be bound is reduced to (N–k'), where k' is an integer obtained by rounding up the value of k.

80. The information processing medium according to claim 79, further comprising determination means for determining, according to designation by the operator, whether the specified number N or the reduced number N–k is utilized as the number of sheets in the final unit.

81. A program product storing a program by which the following means are implemented by a computer, comprising:

input means for inputting a bookbinding setting indicating block book binding printing in which units of a specified number of sheets will be bound collectively;

spooling means for spooling print data in storage means so that the print data can be read out in a desired sequence in units of individual pages;

layout deciding means for deciding layout of pages of the print data so that a number of sheets smaller than the specified number will be bound as one unit if the number of pages to be printed in the final unit is smaller than a number of pages that can be arranged on the specified number of sheets; and reading means for reading print data out of the storage means in a sequence that is in accordance with the layout decided by said layout deciding means to output the print data to the printing apparatus.

82. The program product according to claim 81, wherein, if the number of pages that can be arranged on one unit is 4N and the number of pages to be arranged in the final unit is represented by (4N–4k), where N is a positive integer and k is a positive number, said layout deciding means decides the layout of pages so that the number of sheets of the final unit to be bound is reduced to (N'1k'), where k' is an integer obtained by rounding up the value of k.

83. The program product according to claim 81, further comprising determination means for determining, according to designation by the operator, whether the specified number N or the reduced number N–k is utilized as the number of sheets in the final unit.

84. A print control apparatus outputting print data to a printing apparatus, comprising:

an input unit, adapted to input a bookbinding setting indicating block book binding printing in which units of a specified number of sheets will be bound collectively;

a spooling unit, adapted to spool print data in storage means so that the print data can be read out in a desired sequence in units of individual pages;

a layout unit, adapted to decide layout of pages of the print data so that a number of sheets smaller than the specified number will be bound as one unit if the number of pages to be printed in the final unit is smaller than a number of pages that can be arranged on the specified number of sheets; and a reader, adapted to read print data out of the storage means in a sequence that is in accordance with the layout decided by said layout unit to output the print data to the printing apparatus.

85. The apparatus according to claim 84, wherein, if the number of pages that can be arranged on one unit is 4N and the number of pages to be arranged in the final unit is represented by (4N–4k), where N is a positive integer and k is a positive number, said layout unit decides the layout of pages so that the number of sheets of the final unit to be bound is reduced to (N–k'), where k' is an integer obtained by rounding up the value of k.

86. The apparatus according to claim 84, further comprising a determination unit, adapted to determine, according to designation by the operator, whether the specified number N or the reduced number N–k is utilized as the number of sheets in the final unit.

* * * * *

UNITED STATES PATENT AND TRADEMARK OFFICE
CERTIFICATE OF CORRECTION

PATENT NO.     : 6,307,637 B1
DATED          : October 23, 2001
INVENTOR(S)    : Yasuhiro Kujirai It is certified that error appears in the above-identified patent and that said Letters Patent is hereby corrected as shown below:

Title page,
ABSTRACT,
Line 8, "numbers" should read -- number --.

Drawings,
Sheet 6, Fig. 6, "STRAT" should read -- START --.
Sheet 9, Fig. 9, "WHITCH" should read -- WHICH --.

Column 2,
Line 58, "flowchart" (second occurrence) should read -- the flowchart --.

Column 4,
Line 12, "such" should read -- such as --.

Column 5,
Line 50, "a" should read -- an --.

Column 6,
Line 48, "20BS." should read -- 21BS. --.

Column 7,
Line 15, "device 20Y," should read -- device 21B, --.

Column 8,
Line 12, "15." should read -- 14. --.
Line 37, "are" should read -- is --.

Column 9,
Line 40, "at" should read -- and --.
Line 47, "where" should read -- were --.

Column 10,
Line 8, "bookform" should read -- book form --.
Line 18, "will" should read -- will be --.

Column 12,
Line 51, "print page _2," should read -- print_page_2, --.

UNITED STATES PATENT AND TRADEMARK OFFICE
CERTIFICATE OF CORRECTION

PATENT NO.    : 6,307,637 B1
DATED         : October 23, 2001
INVENTOR(S)   : Yasuhiro Kujirai It is certified that error appears in the above-identified patent and that said Letters Patent is hereby corrected as shown below:

Column 13,
Line 1, "by" should be deleted.
Line 34, "it" should read -- in --.
Line 43, "on" should read -- one --.

Column 17,
Line 31, "i" should be deleted.

Column 18,
Line 63, "an" should be deleted.

Column 19,
Line 57, "an" should be deleted.

Column 20,
Line 23, "were" should read -- where --.

Column 21,
Lines 22, 32, 39, 45, 46 and 62, "book binding" should read -- bookbinding --.

Column 22,
Line 4, "book binding" should read -- bookbinding --.
Line 11, "book binding" should read -- bookbinding --.
Line 17, "book binding" should read -- bookbinding --; and "book bind-" should read -- bookbind- --.
Line 35, "book binding" should read -- bookbinding --.
Line 45, "book binding" should read -- bookbinding --.
Line 53, "book binding" should read -- bookbinding --.
Line 61, "book binding" (both occurrences) should read -- bookbinding --.

Column 23,
Line 11, "book binding" should read -- bookbinding --.
Line 21, "book binding" should read -- bookbinding --.
Line 28, "book binding" should read -- bookbinding --.
Line 34, "book binding" should read -- bookbinding --.
Line 35, "book binding" should read -- bookbinding --.
Line 51, "book binding" should read -- bookbinding --.
Line 61, "book binding" should read -- bookbinding --.

UNITED STATES PATENT AND TRADEMARK OFFICE
CERTIFICATE OF CORRECTION

PATENT NO.    : 6,307,637 B1
DATED         : October 23, 2001
INVENTOR(S)   : Yasuhiro Kujirai It is certified that error appears in the above-identified patent and that said Letters Patent is hereby corrected as shown below:

Column 24,
Line 2, "book binding" should read -- bookbinding --.
Line 7, "book binding" should read -- bookbinding --.
Line 8, "book binding" should read -- bookbinding --.
Line 20, "book binding" should read -- bookbinding --.
Line 50, "book" should read -- book- --.

Column 25,
Line 16, "book binding" should read -- bookbinding --.
Line 50, "book binding" should read -- bookbinding --.

Column 26,
Line 15, "(N'1k')," should read -- (N-k'), --.
Line 25, "book binding" should read -- bookbinding --.

Signed and Sealed this

Twenty-fifth Day of June, 2002

*Attest:*

*Attesting Officer*

JAMES E. ROGAN
*Director of the United States Patent and Trademark Office*